US011451418B2

(12) United States Patent
Fattouche

(10) Patent No.: US 11,451,418 B2
(45) Date of Patent: Sep. 20, 2022

(54) COMMUNICATION SYSTEM OF HIGH CAPACITY

(71) Applicant: Michel Fattouche, Calgary (CA)

(72) Inventor: Michel Fattouche, Calgary (CA)

(*) Notice: Subject to any disclaimer, the term of this patent is extended or adjusted under 35 U.S.C. 154(b) by 0 days.

(21) Appl. No.: 17/607,151

(22) PCT Filed: Jun. 3, 2020

(86) PCT No.: PCT/CA2020/050759
§ 371 (c)(1),
(2) Date: Oct. 28, 2021

(87) PCT Pub. No.: WO2020/243827
PCT Pub. Date: Dec. 10, 2020

(65) Prior Publication Data
US 2022/0166653 A1 May 26, 2022

Related U.S. Application Data

(60) Provisional application No. 62/858,861, filed on Jun. 7, 2019.

(51) Int. Cl.
*H04L 25/03* (2006.01)
*H04B 7/0452* (2017.01)
*H04B 1/00* (2006.01)

(52) U.S. Cl.
CPC ..... *H04L 25/03159* (2013.01); *H04B 1/0032* (2013.01); *H04B 7/0452* (2013.01); *H04L 25/0328* (2013.01); *H04L 25/03343* (2013.01)

(58) Field of Classification Search
None
See application file for complete search history.

(56) References Cited

U.S. PATENT DOCUMENTS 4,797,923 A * 1/1989 Clarke ............... G01J 3/453
324/76.12
6,144,711 A * 11/2000 Raleigh ............... H04L 27/2626
375/349

(Continued)

FOREIGN PATENT DOCUMENTS

CN  106341359 A * 1/2017 ....... H04L 25/03159
CN  106656441 A * 5/2017 ........... H04L 25/024

(Continued)

OTHER PUBLICATIONS

Ba-Ngu Vo and A. Cantoni, "Continuous-time envelope constrained filter design with input uncertainty," in IEEE Transactions on Circuits and Systems I: Fundamental Theory and Applications, vol. 47, No. 10, pp. 1445-1454, Oct. 2000, doi: 10.1109/81.886975. (Year: 2000).*

(Continued)

*Primary Examiner* — Berhanu Tadese
(74) *Attorney, Agent, or Firm* — Kyle R Satterthwaite; Ryan W. Dupuis; Ade & Company Inc.

(57) ABSTRACT

It is an objective of the current disclosure to design a novel communications system capable of offering improvement in channel capacity compared to current communications systems. To this end, the disclosure teaches how to add new information to a select number of Degrees of Freedom (DOF), through three design steps. All three steps aim to design the system such that the minimum required average received Signal-to-Noise Ratio (SNR) is reduced for a given desired capacity and for a given specified mask. The first design step identifies the select number of DOF required for achieving the desired capacity. The second design step enhances the contribution of the selected DOF by matching them to the specified mask. This step aims to have the transmitted signal comply with the specified mask. The third (Continued)

Figure 1:
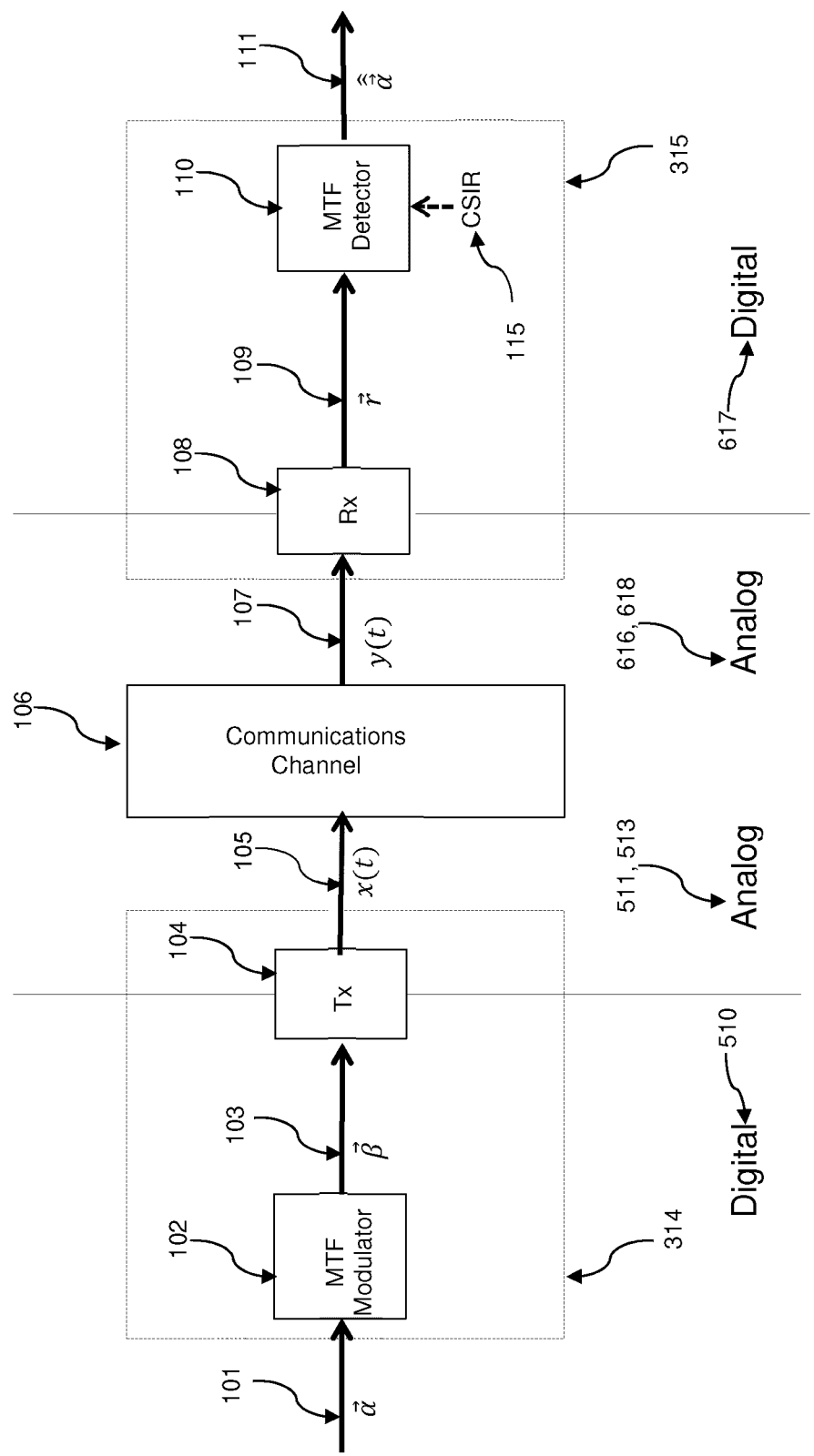

design step randomizes the DOF using a pseudo-random phase. This step aims to reduce the required average received SNR.

20 Claims, 14 Drawing Sheets

(56) References Cited

U.S. PATENT DOCUMENTS

| | | | | |
|---|---|---|---|---|
| 6,377,631 | B1 * | 4/2002 | Raleigh | H04L 25/0204 375/299 |
| 6,452,981 | B1 * | 9/2002 | Raleigh | H04L 27/2608 375/349 |
| 6,678,339 | B1 * | 1/2004 | Lashkarian | H04L 27/2689 714/708 |
| 6,754,264 | B1 * | 6/2004 | Ben Rached | H04L 25/03292 375/232 |
| 6,888,899 | B2 * | 5/2005 | Raleigh | H04L 25/0204 375/349 |
| 6,925,128 | B2 * | 8/2005 | Corral | H04L 27/2614 375/295 |
| 6,987,797 | B2 * | 1/2006 | Fernandez-Corbaton | H04L 25/03038 375/E1.018 |
| 7,035,353 | B2 * | 4/2006 | Fimoff | H04L 25/025 375/346 |
| 7,145,971 | B2 * | 12/2006 | Raleigh | H04L 25/0212 375/347 |
| 7,203,249 | B2 * | 4/2007 | Raleigh | H04L 5/0028 375/267 |
| 7,203,257 | B2 * | 4/2007 | Fimoff | H04L 25/03292 375/316 |
| 7,280,604 | B2 * | 10/2007 | Giannakis | H04L 1/0055 375/267 |
| 7,327,810 | B2 * | 2/2008 | Kim | H04L 25/0242 375/340 |
| 7,382,828 | B2 * | 6/2008 | Amizic | H04L 25/0212 375/233 |
| 7,409,016 | B2 * | 8/2008 | Kim | H04L 25/025 375/340 |
| 7,515,645 | B2 * | 4/2009 | Zschunke | H04L 25/03834 375/348 |
| 7,555,060 | B2 * | 6/2009 | Raleigh | H04B 7/0854 375/267 |
| 7,561,613 | B2 * | 7/2009 | Giannakis | H04B 1/71637 375/135 |
| 7,664,188 | B2 * | 2/2010 | Raleigh | H04L 1/0059 375/347 |
| 7,684,481 | B2 * | 3/2010 | Zeng | H04L 25/03171 375/232 |
| 7,688,888 | B2 * | 3/2010 | Brown | H04L 27/02 375/321 |
| 7,826,560 | B2 * | 11/2010 | Raleigh | H04L 1/0606 370/208 |
| 8,036,307 | B2 * | 10/2011 | Raleigh | H04B 7/0658 375/299 |
| 8,149,960 | B2 * | 4/2012 | Ozen | H04L 25/025 714/796 |
| 8,416,641 | B2 * | 4/2013 | Horsky | G01S 15/325 367/99 |
| 8,442,152 | B2 * | 5/2013 | Raleigh | H04L 27/2608 370/208 |
| 8,630,377 | B2 * | 1/2014 | Coulson | H04L 27/14 375/349 |
| 8,675,791 | B2 * | 3/2014 | Jeanguillaume | G06T 5/003 375/267 |
| 8,755,458 | B2 * | 6/2014 | Raleigh | H04B 7/0615 370/208 |
| 8,787,142 | B2 * | 7/2014 | Cyranka | H04L 27/2647 370/204 |
| 8,958,560 | B2 * | 2/2015 | Kipnis | H04L 9/30 380/255 |
| 9,071,313 | B2 * | 6/2015 | Monsen | H04L 25/03012 |
| 9,106,286 | B2 * | 8/2015 | Agee | H04B 7/10 |
| RE45,775 | E * | 10/2015 | Agee | H04B 7/10 |
| RE45,807 | E * | 11/2015 | Agee | H04W 72/0453 |
| 9,184,820 | B2 * | 11/2015 | Raleigh | H04B 7/0658 |
| 9,197,297 | B2 * | 11/2015 | Agee | H04W 72/042 |
| 9,209,871 | B2 * | 12/2015 | Agee | H04W 24/02 |
| 9,270,450 | B2 * | 2/2016 | Roscoe | H04L 9/0844 |
| 9,319,889 | B2 * | 4/2016 | Cyranka | H04L 5/0092 |
| 9,344,233 | B2 * | 5/2016 | Agee | H04W 52/241 |
| 9,356,666 | B1 * | 5/2016 | Agee | H04B 7/10 |
| 9,391,745 | B2 * | 7/2016 | Agee | H04L 27/2602 |
| 9,401,783 | B1 * | 7/2016 | Agee | H04L 27/2627 |
| 9,515,788 | B2 * | 12/2016 | Agee | H04B 7/10 |
| 9,654,323 | B2 * | 5/2017 | Agee | H04L 27/26 |
| 9,722,842 | B2 * | 8/2017 | Agee | H04W 72/00 |
| 9,780,985 | B1 * | 10/2017 | Tom | H04B 17/345 |
| 9,820,209 | B1 * | 11/2017 | Agee | H04W 72/0453 |
| 10,045,692 | B2 * | 8/2018 | Tumlinson | A61B 3/102 |
| 10,257,765 | B2 * | 4/2019 | Agee | H04W 52/241 |
| 10,327,213 | B1 * | 6/2019 | Han | H04W 52/0206 |
| 10,349,332 | B2 * | 7/2019 | Agee | H04W 72/085 |
| 10,355,906 | B2 * | 7/2019 | Ronte | H04L 27/2671 |
| 10,511,338 | B2 * | 12/2019 | Pekoz | H04L 27/2628 |
| 10,951,454 | B2 * | 3/2021 | Delfeld | H04L 27/34 |
| 11,171,741 | B2 * | 11/2021 | Shen | H03M 13/13 |
| 11,184,122 | B2 * | 11/2021 | Sathyanarayan | H01Q 19/06 |
| 11,278,215 | B2 * | 3/2022 | Demas | A61B 5/091 |
| 11,296,919 | B2 * | 4/2022 | Delfeld | H04B 7/0421 |
| 2009/0323784 | A1 * | 12/2009 | Depienne | H04H 60/80 375/219 |
| 2010/0056215 | A1 | 3/2010 | Gorokhov et al. | |
| 2011/0103500 | A1 * | 5/2011 | Vetterli | H04L 25/03987 375/260 |
| 2011/0267924 | A1 * | 11/2011 | Horsky | G01S 15/931 367/99 |
| 2014/0003470 | A1 * | 1/2014 | Shen | H04B 1/711 375/148 |
| 2015/0230105 | A1 * | 8/2015 | Negus | H04W 72/0406 370/329 |
| 2019/0199383 | A1 * | 6/2019 | Pekoz | H04L 25/03834 |
| 2022/0085928 | A1 * | 3/2022 | Sathyanarayan | H04B 1/385 |
| 2022/0086694 | A1 * | 3/2022 | Kons | H04W 28/16 |
| 2022/0166653 | A1 * | 5/2022 | Fattouche | H04L 27/00 |
| 2022/0190879 | A1 * | 6/2022 | Rakib | H04B 7/024 |

FOREIGN PATENT DOCUMENTS

| | | | | |
|---|---|---|---|---|
| CN | 109588059 | A * | 4/2019 | H04B 7/0452 |
| CN | 109588064 | A * | 4/2019 | H04B 7/0486 |
| CN | 106341359 | B * | 7/2019 | H04L 25/03159 |
| CN | 107426120 | B * | 3/2021 | H04B 13/02 |
| CN | 109588059 | B * | 11/2021 | H04B 7/0452 |
| CN | 109588059 | B8 * | 1/2022 | H04B 7/0452 |
| EP | 2383583 | A2 * | 11/2011 | G01S 15/325 |
| JP | 02080590 | A * | 3/1990 | H04L 5/0028 |
| JP | 4164364 | B2 * | 10/2008 | H04L 25/0204 |
| TW | 201125324 | A * | 7/2011 | H04L 25/0228 |
| TW | 202105924 | A * | 2/2021 | H04B 1/0032 |
| WO | WO-9949632 | A1 * | 9/1999 | H04B 1/707 |
| WO | 02080590 | | 10/2002 | |
| WO | WO-02080590 | A2 * | 10/2002 | H04L 12/189 |
| WO | WO-02080590 | A3 * | 3/2003 | H04L 12/189 |
| WO | WO-2004012356 | A1 * | 2/2004 | H04B 1/7093 |
| WO | WO-2004095789 | A1 * | 11/2004 | H04L 25/03063 |
| WO | WO-2004107691 | A1 * | 12/2004 | H04L 25/023 |
| WO | WO-2005062562 | A1 * | 7/2005 | H04L 25/0242 |
| WO | WO-2005114931 | A1 * | 12/2005 | H04L 25/03057 |
| WO | WO-2007028917 | A2 * | 3/2007 | H04B 1/7103 |
| WO | WO-2011053732 | A2 * | 5/2011 | H04L 25/0228 |
| WO | WO-2011151680 | A1 * | 12/2011 | H04L 9/30 |
| WO | WO-2014004729 | A1 * | 1/2014 | H04B 1/7103 |
| WO | WO-2019089986 | A1 * | 5/2019 | H04B 7/0421 |
| WO | WO-2019113046 | A1 * | 6/2019 | H01Q 1/246 |
| WO | WO-2020142520 | A1 * | 7/2020 | H04W 16/02 |
| WO | WO-2020206304 | A1 * | 10/2020 | H04B 7/024 |
| WO | WO-2020227619 | A1 * | 11/2020 | H04B 7/024 |
| WO | WO-2020243827 | A1 * | 12/2020 | H04B 1/0032 |

(56) References Cited

FOREIGN PATENT DOCUMENTS

| WO | WO-2020247768 A1 | * | 12/2020 | ........... H04B 7/0456 |
| WO | WO-2021026212 A1 | * | 2/2021 | |
| WO | WO-2021080510 A1 | * | 4/2021 | |
| WO | WO-2021197606 A1 | * | 10/2021 | |

OTHER PUBLICATIONS

M. Fattouche, "A Novel Communication System of High Capacity," in IEEE Systems Journal, vol. 14, No. 3, pp. 4197-4208, Sep. 2020, doi: 10.1109/JSYST.2019.2961131. (Year: 2020).*
S. B. Slimane, "Performance of OFDM systems with time-limited waveforms over multipath radio channels," IEEE GLOBECOM 1998 (Cat. No. 98CH36250), 1998, pp. 962-967 vol.2, doi: 10.1109/GLOCOM.1998.776872. (Year: 1998).*
K. Yang and A. E. Yilmaz, "A Three-Dimensional Adaptive Integral Method for Scattering From Structures Embedded in Layered Media," in IEEE Transactions on Geoscience and Remote Sensing, vol. 50, No. 4, pp. 1130-1139, Apr. 2012, doi: 10.1109/TGRS.2011.2166765. (Year: 2012).*

* cited by examiner

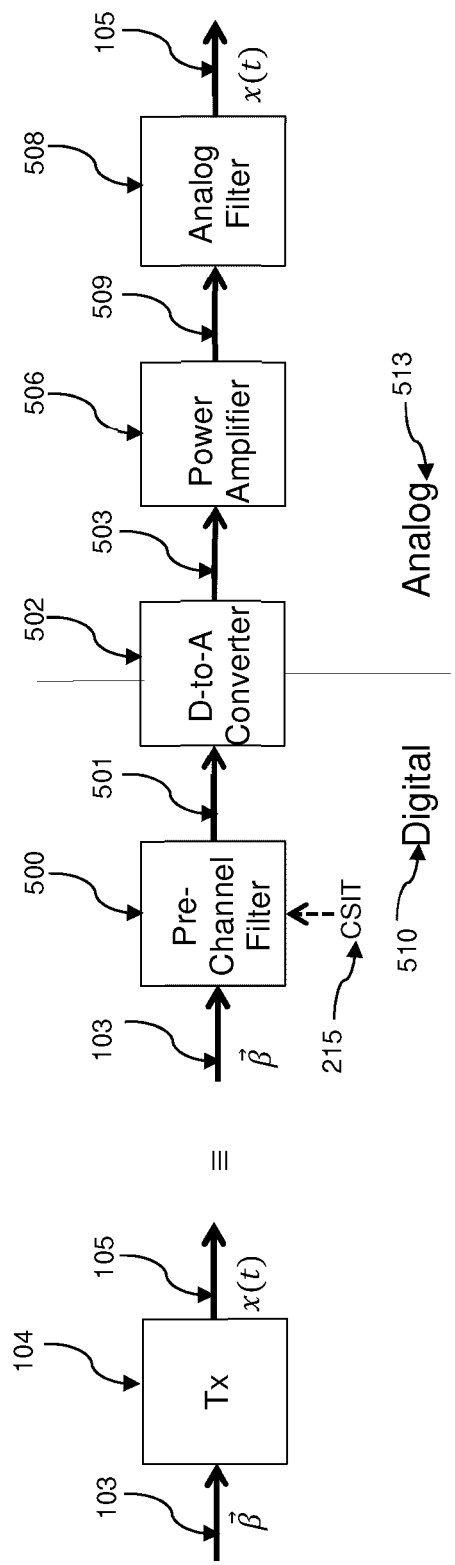
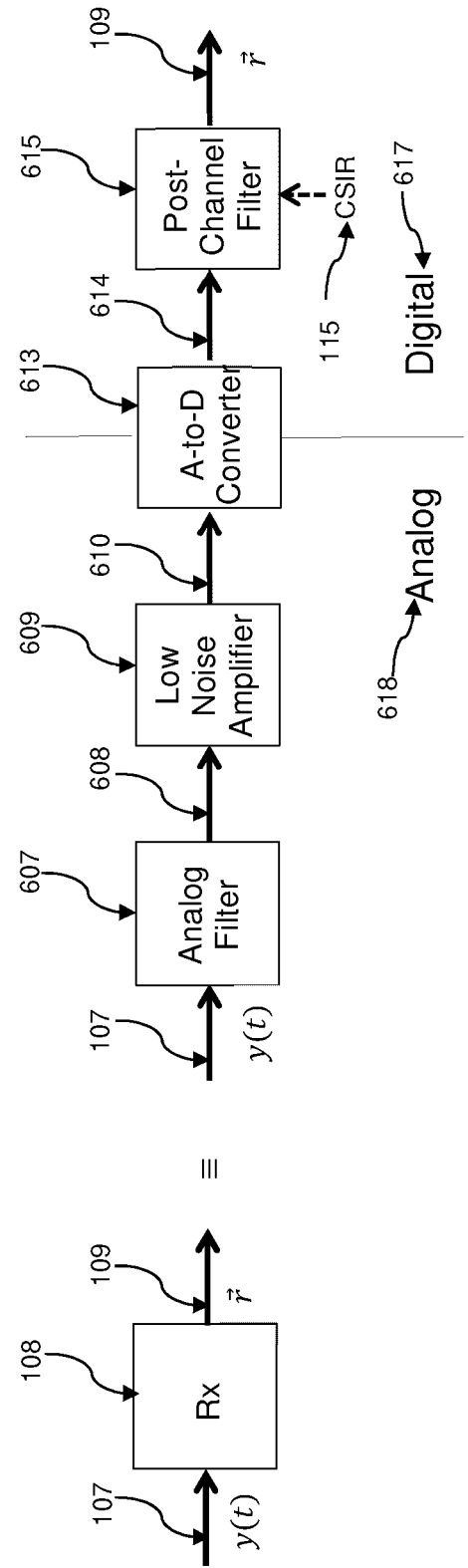
Figure 6a
Figure 6b $$h = \begin{pmatrix} h_{Basic,1} & \cdots & h_{Basic,N_d} & 0_{d\times K} & \cdots & 0_{d\times K} \\ 0_{d\times K} & \cdots & 0_{d\times K} & h_{Basic,1} & \cdots & h_{Basic,N_d} \\ \vdots & & \vdots & \vdots & & \vdots \\ 0_{d\times K} & \cdots & 0_{d\times K} & 0_{d\times K} & \cdots & 0_{d\times K} \\ \vdots & & \vdots & \vdots & & \vdots \\ 0_{d\times K} & \cdots & 0_{d\times K} & 0_{d\times K} & \cdots & 0_{d\times K} \end{pmatrix}$$

Figure 11a $$h_{MTF} = \begin{pmatrix} h_{B\_MTF,1} & \cdots & h_{B\_MTF,N_d} & 0_{d\times K} & \cdots & 0_{d\times K} \\ 0_{d\times K} & \cdots & 0_{d\times K} & h_{B\_MTF,1} & \cdots & h_{B\_MTF,N_d} \\ \vdots & & \vdots & \vdots & & \vdots \\ 0_{d\times K} & \cdots & 0_{d\times K} & 0_{d\times K} & \cdots & 0_{d\times K} \\ \vdots & & \vdots & \vdots & & \vdots \\ 0_{d\times K} & \cdots & 0_{d\times K} & 0_{d\times K} & \cdots & 0_{d\times K} \end{pmatrix}$$

Figure 11b

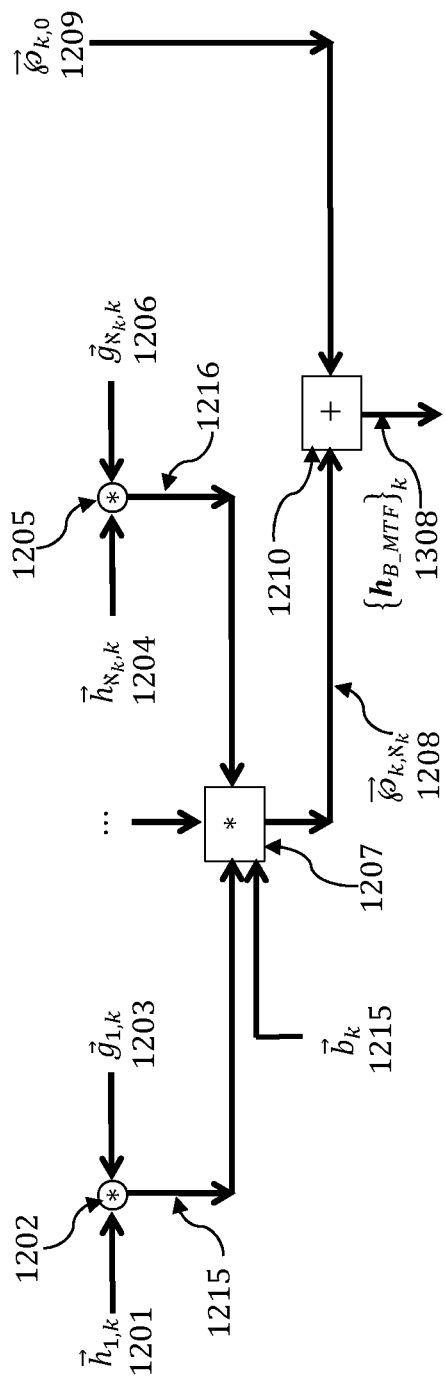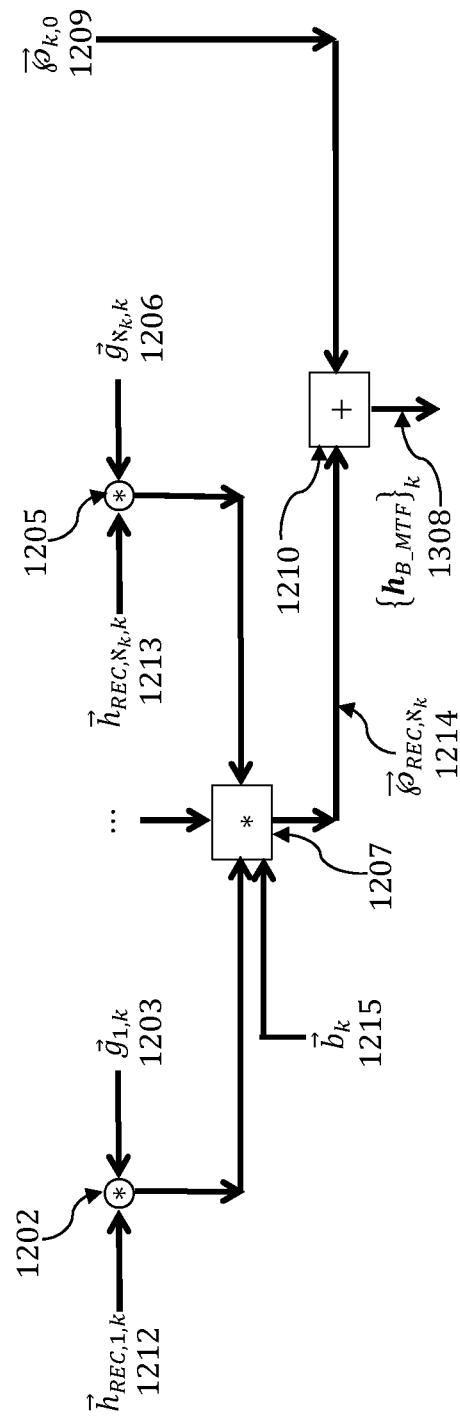
Figure 12a
Figure 12b

COMMUNICATION SYSTEM OF HIGH CAPACITY

1. FIELD OF THE INVENTION

The present invention relates generally to the field of communications where it is desirable to communicate between a number of transmitting units (TUs) and receiving units (RUs):
1. at a relatively high communications rate, over a communications channel, while
2. reducing the complexity, cost, latency, bandwidth (BW) and power consumption of the TUs and RUs.

The present invention relates to methods and apparatuses for communications over a varied number of physical media such as: satellite, radio, audio, video, microwave, millimeter (mm) wave, telephone line, subscriber loop, optical fiber cable, coaxial cable, twisted pair, USB cable, wireless, laser, infrared, power-line, tropospheric, ionospheric, Very High Frequency (VHF), Ultra High Frequency (UHF), etc.

The present invention relates to methods and apparatuses for communications using a varied number of examples of TUs and of RUs such as: a base station (BS), or an access point (AP), a satellite transponder, a cellular telephone, a mobile telephone, a PCS telephone, a wireline modem, a wireless modem, a power line modem, a WiFi station, Zigbee node, a Bluetooth radio, computers, tablets, PDAs, sensors, watches, an Internet-of-Things (IOT) device, a Wireless Sensor Network (WSN) device, etc.

The present invention relates to a varied number of communications networks such as:
1. A centralized network with a downlink (DL) portion from BS/AP to device, and/or an uplink (UL) portion from device to BS/AP, where we have referred to a BS/AP as the infrastructure unit of the network, and to a device as a unit receiving/transmitting services (voice, data, video, etc.) from/to the infrastructure units. A device includes a cellular telephone, a mobile telephone, a PCS telephone, a wireline modem, a wireless modem, a WiFi station, a Zigbee node, a Bluetooth radio, etc. Each BS/AP and each device comprises a TU and/or an RU.
2. A distributed network where all TUs/RUs act either as a BS/AP or as a device, or both, including mesh networks, multi-hop networks, peer-to-peer networks etc. Each node comprises a TU and/or an RU.

The present invention relates to a varied number of communications applications such as ones with: 1. an UL emphasis such as Wireless Sensor Networks (WSN), 2. a DL emphasis such as Downstreaming Video (DV), 3. a Multicasting emphasis such as in radio and wireless systems, 4. a Broadcasting emphasis such as in AM, FM, DAB and GPS/Glonass/Galileo systems, and 5. a peer-to-peer emphasis such as driverless cars.

The present invention relates to a varied number of standards such as: 1. 3G standards, 4G standards (also known as Long Term Evolution (LTE)), 5G standards, etc., 2. WiFi (IEEE 802.11a, b, g, n, ax, ac, ad, etc.) standards, 3. Bluetooth and Zigbee standards, 4. LoRa standards, 5. UWB standards, etc., to name a few.

The present invention relates to a varied number of communications networks with various ranges between each TU and its designated RU(s) such as: 1. Ultra long range communications including deep space systems, 2. long range communications including satellite, micro-wave links, LoRa and cellular systems, 3. medium range communications such as WiFi and laser systems, and 4. short range communications such as Zigbee and Bluetooth systems.

The present invention relates to a varied number of communications networks with various types of TUs and RUs such as: 1. TUs comprising one transmitter (Tx), also referred to as single input (SI), 2. RUs comprising one receiver (Rx), also referred to as single output (SO), 3. TUs comprising multiple Txs, also referred to as multiple input (MI) (also known as Multi-User (MU)), and 4. RUs comprising multiple Rxs, also referred to as multiple output (MO).

The present invention relates to a varied number of communications networks with various types of MI such as: 1. MI which can collaborate, and 2. MI which cannot collaborate, such as MU networks. Based on the above, this disclosure uses SISO, MISO, SIMO, MU-MISO and/or MU-MIMO communications links.

2. BACKGROUND OF THE INVENTION

In many applications, it is desirable to communicate between a number of TUs and a number of RUs over a communications channel, in an efficient way where complexity, BW, power consumption, latency and cost of each of the TUs and/or RUs are reduced while the transmission rate and range between each TU and its designated RU(s) are increased. In some applications, the specified channel is constrained by a mask, while the cost of each of the TUs and RUs is mainly dictated by its complexity. Reducing the power consumption of each of the TUs and RUs, while increasing its transmission rate, $R_b$, across a channel constrained by a mask of BW, $\mathcal{W}_m$, can be usually considered a trade-off between power efficiency and bandwidth efficiency, $\eta$. Power efficiency is usually measured in terms of (how small) the minimum average received Signal Power-to-Noise Power Ratio (SNR), $\overline{SNR}$, that is required to achieve a specific performance (such as Bit Error Rate (BER)), while bandwidth efficiency, $\eta$, is usually measured in terms of (how large) the number of bits that can be communicated per second, $R_b$, per Hertz (bps/Hz) of mask BW, $\mathcal{W}_m$, between each TU and its designated RU(s) across a communications channel. This trade-off is often captured by an all-encompassing figure of merit, the well-known channel capacity, $\mathcal{C}$, which provides an upper bound on $$R_b \triangleq \eta \times \mathcal{W}_m$$

that can be achieved as function of $\overline{SNR}$.

This disclosure extends the capacity, $\mathcal{C}_{BL}$, of a band-limited (BL) channel to include the capacity, $\mathcal{C}_{TL}$, of a Time-Limited (TL) channel. Wyner first studied the capacity, $\mathcal{C}_{TL}$, of a TL system in 1966, after constraining the system to be approximately Band-Limited (BL). When the system is instead constrained to be Root Mean Square (RMS) BL, reducing interference between input signals is accomplished by minimizing the RMS bandwidth of each signal. The solution of such a minimization was shown by Gabor to be one lobe of a sine wave. Over time, the notion that practical communication systems are approximately BL was replaced by the notion that they are indeed BL as far as the channel capacity, $\mathcal{C}_{TL}$, is concerned. This was because it was thought that the high frequency components, which exist in a TL system and which fall far below the noise floor when the system is constrained by a spectral mask, couldn't realistically contribute to the channel capacity, $\mathcal{C}_{TL}$, of the TL system. The disclosure shows that such components can indeed contribute significantly to $\mathcal{C}_{TL}$, based on the fact that they represent an arbitrarily large number of Finite Access Time (FAT) Degrees of Freedom (DOF) with the ability to offer a linear SNR contribution towards the capacity. This is in contrast with BL systems, which contain a finite number of FAT DOF, and consequently, can only offer a logarithmic SNR contribution towards the capacity. By definition, the time to access a FAT DOF is finite.

More specifically, this disclosure introduces novel means and apparatuses for designing communications systems and techniques that are able to increase their channel capacity, $\mathcal{C}_{TL}$, compared to the capacity, $\mathcal{C}_{BL}$, of existing communications systems by transporting incremental information across the arbitrarily large number of FAT DOF that exist in a TL waveform. In contrast, existing systems are assumed to be BL and therefore are assumed to have a limited number of FAT DOF with a limited ability to carry incremental information. Moreover, existing communications systems attempt to comply with the constraint of a mask through the use of certain filters, either digital or analog, selected primarily as to not cause a significant loss in orthogonality between input signals, while restricting their signal BW as much as possible in the hope of maintaining their BL status. On the other hand, the current disclosure takes advantage of the existence of the arbitrarily large number of FAT DOF in a TL system, by matching parts of the FAT DOF in a TL system to the imposed mask. We refer to such a matching as a Mask-Matched TL method with FAT DOF, or the MTF method for short, and refer to the apparatus, which performs such a matching as the MTF apparatus.

Examples of the imposed mask in MTF methods and apparatuses include current wireless standards, such as WiFi and LTE systems, as well as future $5^{th}$ Generation (5G) wireless standards, which promise to deliver more than 10 Gbps download capacities. In order to meet the promised 5G download capacities, current systems require a channel with an estimated median BW of 3.5 GHz. This large BW is only available across mm-wave bands (26 GHz, 28 GHz, 38 GHz, and 60 GHz). Such bands suffer from a high path loss and are not multipath rich. The high path loss restricts coverage to Line-of-Sight (LOS) coverage, while a poor multipath environment limits the number of spatial DOF in a MIMO system. Moreover, mm-wave bands are expensive and potentially harmful. By relying on MTF systems, this disclosure shows how to exceed current wireless standards as well as how to meet and exceed the 10 Gbps requirement for 5G systems with a BW, $\mathcal{W}_m = 20$ MHz, with a carrier frequency in the mid-band spectrum of [2 GHz, 6 GHz], i.e. without requiring mm-wave transmissions.

3. SUMMARY OF THE INVENTION

It is an objective of the current disclosure to design novel communications systems that are capable of offering substantial improvement in channel capacity compared to current communications systems. To this end, the disclosure derives the channel capacity, $\mathcal{C}_{TL}$, of a Time-Limited (TL) system across a communication channel contaminated by interference and by noise. The potential increase in channel capacity is shown to be due to the availability of an arbitrarily large number of FAT DOF in a TL system. Such FAT DOF are able to carry incremental information compared to the information that is carried by existing systems. By taking advantage of the arbitrarily large number of FAT DOF in a TL system, the disclosure shows that such incremental information can be made arbitrarily large as well, forcing the channel capacity, $\mathcal{C}_{TL}$, of the TL system to contain a new SNR region, referred to as the medium SNR region, in addition to the traditional low and high SNR regions found in the capacity, $\mathcal{C}_{BL}$, of a BL system. The newly created SNR region allows for the design of a novel TL system, namely the MTF system, where doubling $\mathcal{C}_{TL}$ requires only a fixed multiple increase in SNR, as opposed to a BL system where doubling $\mathcal{C}_{BL}$ requires a geometric multiple increase in SNR. The medium SNR region loads between 1 and 2 bits of information/DOF. This is in contrast with either the low SNR region, which loads <1 bit of information/DOF, or the high SNR region, which typically loads >1 bit of information/DOF.

Recently, several systems found a way to increase the number of their DOF. Such systems include MU systems, which form the basis for 3G wireless systems, and MIMO systems, which are currently adopted in most cellular standards, including 4G and 5G wireless systems. MU systems correspond to having K co-located users, each with a spreading gain N, which is the number of their DOF, while MIMO systems correspond to having K transmit antennas and N receive antennas where the number of DOF≤min {K, N}. Despite the fact that both systems have the ability to arbitrarily increase the number of their DOF, their respective capacities do not contain a medium SNR region since both systems fail to realize that, under certain conditions, some DOF, namely the FAT DOF, can offer a linear SNR contribution towards the capacity, by carrying incremental information. The current disclosure shows that in an MTF system, it is possible to force parts of the high SNR region to fall into the medium SNR region through the use of multiple receiving antennas such as in MIMO and/or in MU-MIMO communications. In summary, the disclosure shows several designs of MTF systems, which outperform current systems, including one design that is shown to meet future 5G capacity specifications without requiring mm-wave bands.

4 DETAILED DESCRIPTION OF THE DRAWINGS

The present invention, both as to its organization and manner of operation, may best be understood by reference to the following descriptions, and the accompanying drawings of various embodiments wherein like reference numerals are used throughout the several views, and in which:

FIG. 1 is a schematic view of an embodiment of a SISO communications link between one TU 314 and one RU 315, over a communications channel 106, the link comprising MTF Modulator 102, part of the digital side 510, which converts the (possibly Forward Error Correction (FEC) coded) information vector, $\vec{\alpha}$ 101, into an MTF (digital) vector, $\vec{\beta}$ 103, transmitter, Tx 104, part of the digital side 510 and analog side 511, 513, which converts the MTF (digital) vector, $\vec{\beta}$ 103, into a transmitted MTF (analog) signal, x(t) 105, communications channel 106 which transports the transmitted MTF (analog) signal, x(t) 105 from Tx 104 to be received as y(t) 107 at Rx 108, receiver Rx 108, part of the analog side 616, 618 and digital side 617, which converts the MTF (analog) signal, y(t) 107, into a received MTF (digital) vector, $\vec{r}$ 109, and MTF Detector 110 part of the digital side 617, which detects the (possibly FEC coded) information vector, $\vec{\alpha}$ 101, as $\hat{\vec{\alpha}}$ 111 from the received MTF (digital) vector, $\vec{r}$ 109, using an estimate (possibly using a training sequence), which we refer to as Channel State Information at Receiver (CSIR) 115, of the state of the communications channel 106.

Figure 2:
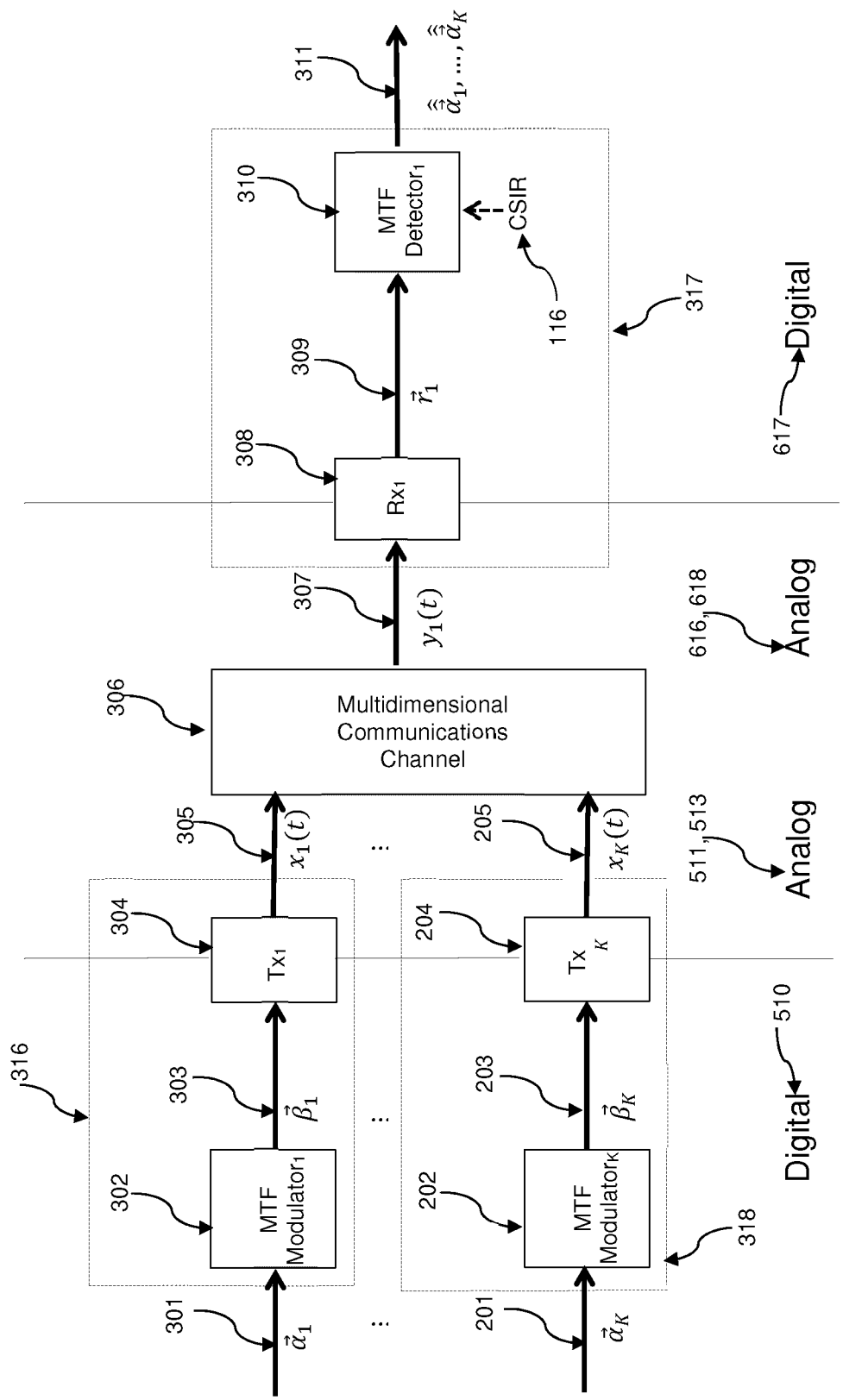

FIG. 2 is a schematic view of an embodiment of a MU-MISO communications link comprising K TUs 316, . . . , 318, and one RU 317, across a Multidimensional communications channel 306, the TU 316 comprising MTF Modulator$_1$ 302, part of the digital side 510, which converts the (possibly FEC coded) information vector, $\vec{\alpha}_1$ 301, into an MTF (digital) vector, $\vec{\beta}_1$ 303, and Tx$_1$ 304, part of the digital side 510 and analog side 511, 513, which converts the MTF (digital) vector, $\vec{\beta}_1$ 303, into a transmitted MTF (analog) signal, x$_1$(t) 305.

The TU 318 comprises

MTF Modulator$_K$ 202, part of the digital side 510, which converts the (possibly FEC coded) information vector, $\vec{\alpha}_K$ 201, into an MTF (digital) vector, $\vec{\beta}_K$ 203, part of the digital side 510, and Tx$_K$ 204, part of the digital side 510 and analog side 511, 513, which converts the MTF (digital) vector, $\vec{\beta}_K$ 203, into a transmitted MTF (analog) signal, x$_K$(t) 205.

The RU 317 comprises

Rx$_1$ 308, part of the analog side 616, 618 and digital side 617, which converts the MTF (analog) signal, y$_1$(t) 307, into a received MTF (digital) vector, $\vec{r}_1$ 309, and MTF Detector$_1$ 310, MTF Detector 110 part of the digital side 617, which detects the (possibly FEC coded) information vectors, $\vec{\alpha}_1$ 301, . . . , $\vec{\alpha}_K$ 201 as $\hat{\vec{\alpha}}_1$ 311, . . . , $\hat{\vec{\alpha}}_K$ 211 from the received MTF (digital) vector, $\vec{r}_1$ 309, using CSIR 116, which is an estimate (possibly using a training sequence) of the state of the Multidimensional communications channel 306.

Figure 3:
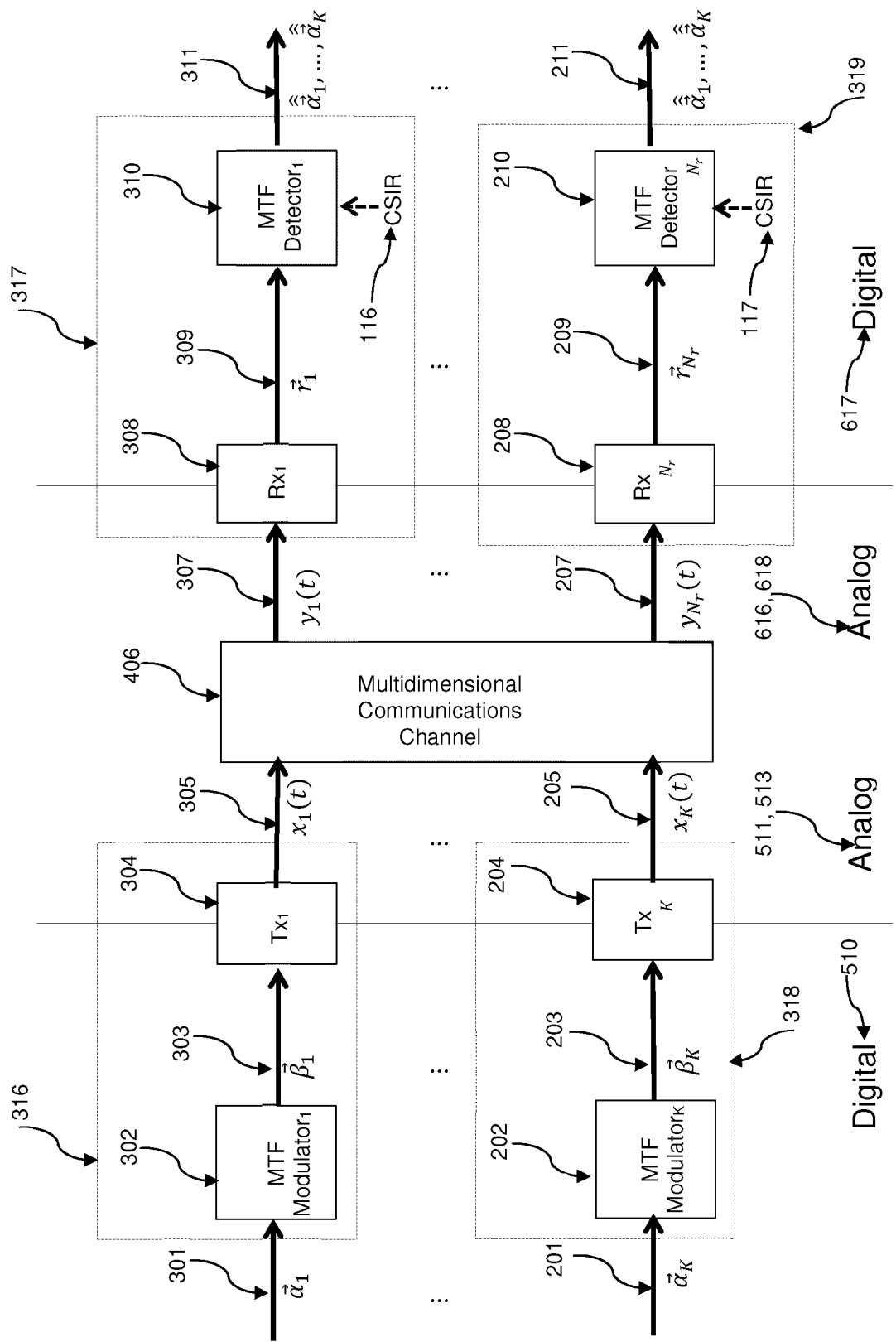

FIG. 3 is a schematic view of an embodiment of a MU-MIMO communications link comprising K TUs 316, . . . , 318, and N$_r$ non-collaborating RUs 317, . . . , 319, across a Multidimensional communications channel 406, the TU 316 comprising MTF Modulator$_1$ 302, part of the digital side 510, which converts the (possibly FEC coded) information vector, $\vec{\alpha}_1$ 301, into an MTF (digital) vector, $\vec{\beta}_1$ 303, and Tx$_1$ 304, part of the digital side 510 and analog side 511, 513, which converts the MTF (digital) vector, $\vec{\beta}_1$ 303, into a transmitted MTF (analog) signal, x$_1$(t) 305.

The TU 318 comprises

MTF Modulator$_K$ 202, part of the digital side 510, which converts the (possibly FEC coded) information vector, $\vec{\alpha}_K$ 201, into an MTF (digital) vector, $\vec{\beta}_K$ 203, and Tx$_K$ 204, part of the digital side 510 and analog side 511, 513, which converts the MTF (digital) vector, $\vec{\beta}_K$ 203, into a transmitted MTF (analog) signal, x$_K$(t) 205.

The RU 317 comprises

Rx$_1$ 308, part of the analog side 616, 618 and digital side 617, which converts the MTF (analog) signal, y$_1$(t) 307, into a received MTF (digital) vector, $\vec{r}_1$ 309, and MTF Detector$_1$ 310, MTF Detector 110 part of the digital side 617, which detects the (possibly FEC coded) information vectors $\vec{\alpha}_1$ 301, . . . , $\vec{\alpha}_K$ 201 as $\hat{\vec{\alpha}}_1$ 311, . . . , $\hat{\vec{\alpha}}_K$ 211 from the received MTF (digital) vector, $\vec{r}_1$ 309, using CSIR 116, which is an estimate (possibly using a training sequence) of the state of the Multidimensional communications channel 406.

The RU 319 comprises

Rx$_{N_r}$ 208, part of the analog side 616, 618 and digital side 617, which converts the MTF (analog) signal, y$_{N_r}$(t) 207, into a received MTF (digital) vector, $\vec{r}_{N_r}$ 209, and MTF Detector$_{N_r}$ 210, MTF Detector 110 part of the digital side 617, which detects the (possibly FEC coded) information vectors $\vec{\alpha}_1$ 301, . . . , $\vec{\alpha}_K$ 201 as $\hat{\vec{\alpha}}_1$ 311, . . . , $\hat{\vec{\alpha}}_{K\,K}$ 211, from the received MTF (digital) vector, $\vec{r}_{N_r}$ 209, using CSIR 117, which is an estimate (possibly using a training sequence) of the state of the communications channel 406.

Figure 4:
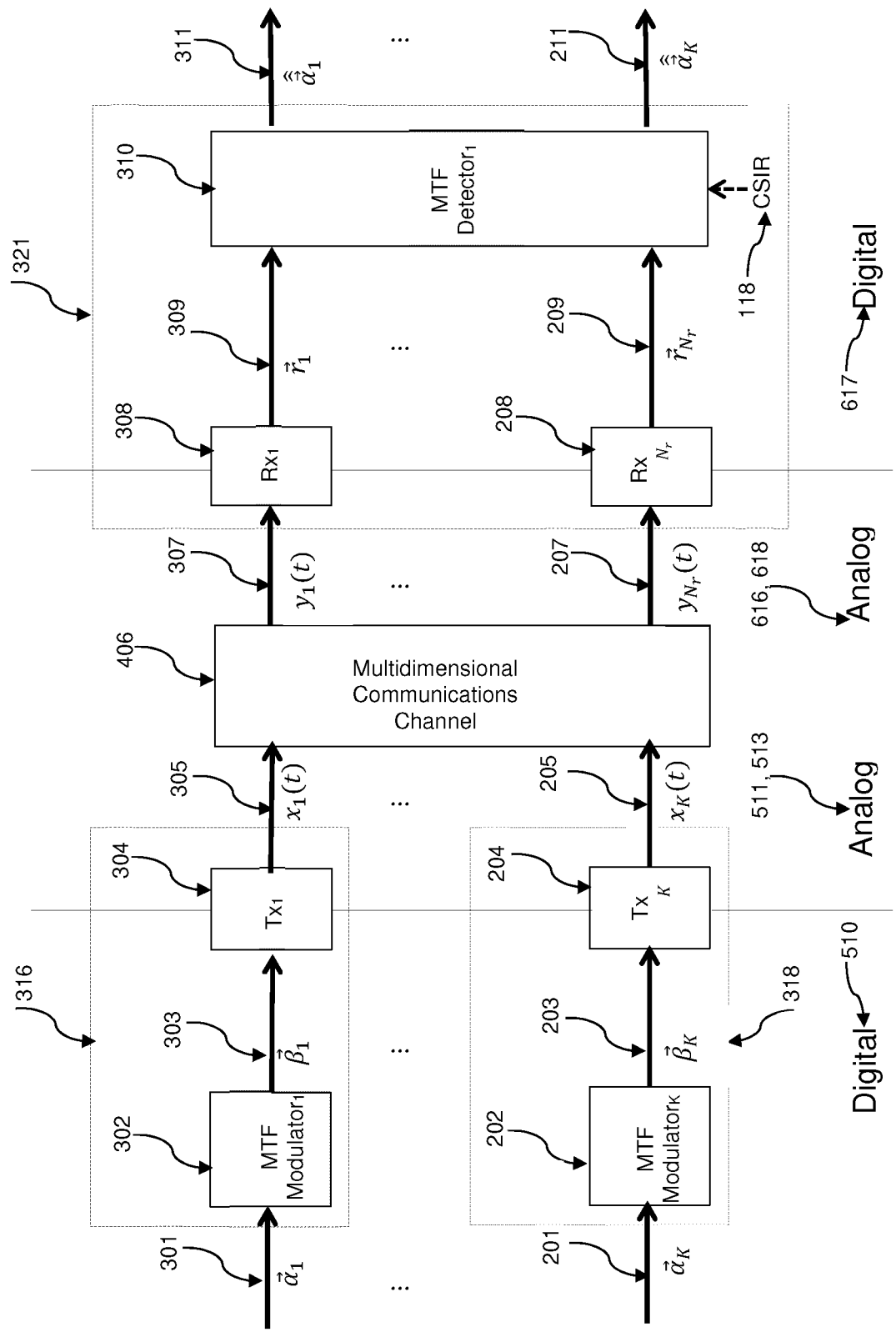

FIG. 4 is a schematic view of an embodiment of a MU-MIMO communications link comprising K TUs 316, . . . , 318, and one RU 321 with N$_r$ collaborating Rxs 308, . . . , 208, across a Multidimensional communications channel 406, the TU 316 comprising MTF Modulator$_1$ 302, part of the digital side 510, which converts the (possibly FEC coded) information vector, $\vec{\alpha}_1$ 301, into an MTF (digital) vector, $\vec{\beta}_1$ 303, and Tx$_1$ 304, part of the digital side 510 and analog side 511, 513, which converts the MTF (digital) vector, $\vec{\beta}_1$ 303, into a transmitted MTF (analog) signal, x$_1$(t) 305.

The TU 318 comprises

MTF Modulator$_K$ 202, part of the digital side 510, which converts the (possibly FEC coded) information vector, $\vec{\alpha}_K$ 201, into an MTF (digital) vector, $\vec{\beta}_K$ 203, and Tx$_K$ 204, part of the digital side 510 and analog side 511, 513, which converts the MTF (digital) vector, $\vec{\beta}_K$ 203, into a transmitted MTF (analog) signal, x$_K$(t) 205.

The RU 321 comprises

N$_r$ Rx 308, . . . , 208, part of the analog side 616, 618 and digital side 617, which converts the MTF (analog) signals, y$_1$(t), . . . , y$_{N_r}$(t) 307, . . . , 207 into N$_r$ received MTF (digital) vectors, $\vec{r}_1$, . . . $\vec{r}_{N_r}$ 309, . . . , 209 respectively, and MTF Detector$_1$ 310, MTF Detector 110 part of the digital side 617, which detects the (possibly FEC coded) K information vectors, $\vec{\alpha}_1$ 301, . . . , $\vec{\alpha}_K$ 201, as $\hat{\vec{\alpha}}_1$ 311, . . . , $\hat{\vec{\alpha}}_K$ 211, from the received MTF (digital) vectors $\vec{r}_1$ 109, . . . , $\vec{r}_{N_r}$ 209, using CSIR 118, which is an estimate (possibly using a training sequence) of the state of the channel 406.

Figure 5A:
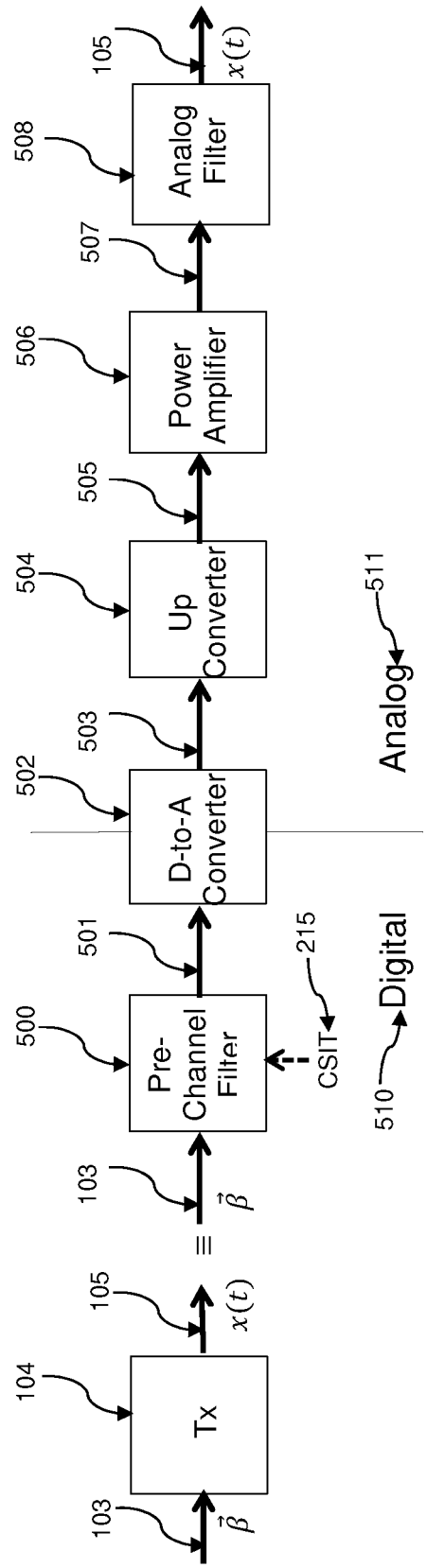

FIG. 5a is a schematic view of an embodiment of Tx 104 (204, 304) for converting a baseband-sampled (consisting of complex samples) or an IF-sampled (consisting of real samples) MTF (digital 510) discrete-time vector, $\vec{\beta}$ 103 (203, 303), into an MTF (analog 511) continuous-time RF signal, x(t) 105 (205, 305), to be transmitted, Tx 104 (204, 304) comprising a Pre-Channel Filter 500 to pre-filter the baseband-sampled or the IF-sampled MTF (digital 510) vector, $\vec{\beta}$ 103 (203, 303), based on the knowledge of the statistics of the channel 106 (306, 406) represented by Channel State Information at Transmitter (CSIT) 215, at Tx 104 (204, 304), a Digital-to-Analog (D-to-A) Converter 502 to convert the pre-channel baseband-sampled or IF-sampled filtered MTF (digital 510) vector 501 into an analog 511 baseband or IF MTF signal 503, an Up-Converter 504 to convert the analog baseband or IF MTF signal 503 into an up-converted analog 511 RF MTF (passband) signal 505, a Power Amplifier (PA) 506 to amplify the up-converted analog 511 RF signal 505 into an amplified up-converted analog RF MTF signal 507, and an Analog Filter 508 to filter the amplified up-converted analog 511 RF MTF signal 507 into a filtered amplified up-converted analog 511 RF MTF signal x(t) 105 (205, 305), which complies with a pre-specified spectral mask 701.

Figure 5B:
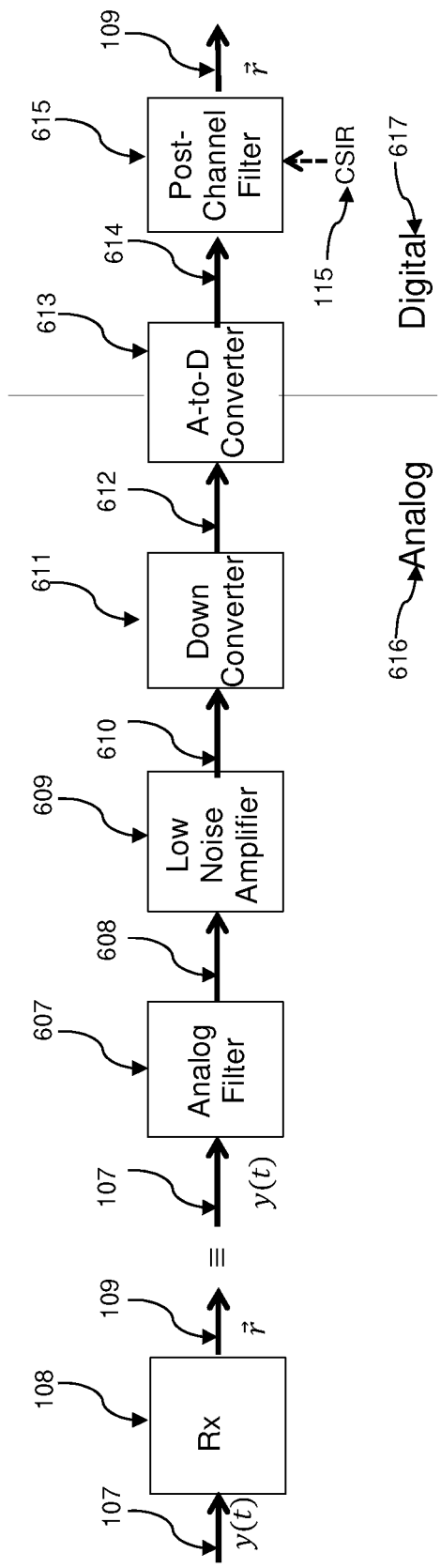

FIG. 5b is a schematic view of an embodiment of Rx 108 (208, 308) for converting a received MTF (analog 616) continuous-time RF signal, y(t) 107 (207, 307), into a received baseband-sampled (consisting of complex samples) or IF-sampled (consisting of real samples), MTF (digital) discrete-time vector, $\vec{r}$ 109 (209, 309), to be used for detecting the original (possibly FEC coded) information vector, $\vec{\alpha}$ 101 (201, 301), Rx 108 (208, 308) comprising an Analog Filter 607 to filter the received MTF (analog 616) RF signal, y(t) 107 (207, 307), into a filtered received analog RF MTF signal 608 (to filter and excise out-of-band noise and narrowband interferers), a Low Noise Amplifier (LNA) 609 to amplify the filtered received analog 616 RF MTF signal 608, into an amplified filtered received analog 616 RF MTF signal 610, a Down-Converter 611 to convert the amplified filtered received analog 616 RF MTF signal 610, into an amplified filtered received analog baseband or IF MTF signal 612, and an Analog-to-Digital (A-to-D) Converter 613 to convert the amplified filtered received analog 616 baseband or IF MTF signal 612, into a baseband-sampled or IF-sampled digital 617 amplified filtered received MTF vector 614, a Post-Channel Filter 615 to convert the baseband-sampled or IF-sampled digital 617 amplified filtered received MTF vector 614 into a post-channel filtered baseband-sampled or IF-sampled MTF vector $\vec{r}$ 109 (209, 309) based on CSIR 115.

FIG. 6a is a schematic view of an alternative embodiment of Tx 104 for converting an RF-sampled, MTF (digital 510) discrete-time vector, $\vec{\beta}$ 103 (203, 303), (consisting of real samples) into an (analog 513) continuous-time RF MTF signal, x(t) 105 (205, 305), to be transmitted, Tx 104 (204, 304) comprising a Pre-Channel Filter 500 to pre-filter the RF sampled, pre-channel filtered, MTF (digital) vector, $\vec{\beta}$ 103 (203, 303), based on CSIT 215 at Tx 104 (204, 304), a D-to-A Converter 502 to convert the RF sampled, MTF (digital 510) vector 501, into an analog 513 RF MTF signal 503, a PA 506 to amplify the analog 513 RF MTF signal 503, into an amplified analog 513 RF MTF signal 509, and an Analog Filter 508 to filter the amplified analog 513 RF MTF signal 507, into a filtered amplified analog 513 RF MTF signal x(t) 105 (205, 305), which complies with a pre-specified spectral mask 701.

FIG. 6b is a schematic view of an alternative embodiment of Rx 108 (208, 308) for converting a received (analog 618) continuous-time RF MTF signal, y(t) 107 (207, 307), into a received RF MTF sampled, (digital 617) discrete-time MTF vector, $\vec{r}$ 109 (209, 309), (consisting of real samples) to be used for detecting the original information vector, $\vec{\alpha}$ 101 (201, 301), Rx 108 208, 308) comprising an Analog Filter 607 to filter the received (analog 618) RF MTF signal, y(t) 107 (207, 307), into a filtered received analog 618 RF MTF signal 608 (to filter out-of-band noise and narrowband interferers), an LNA 609 to amplify the filtered received analog 618 RF MTF signal 608, into an amplified filtered received analog 618 RF MTF signal 610, and an A-to-D Converter 613 to convert the amplified filtered received analog 618 RF MTF signal 612, into an RF sampled digital 617 amplified filtered received MTF vector 614, a Post-Channel Filter 215 to convert the RF sampled digital 617 amplified filtered received MTF vector 614 into a post-channel filtered RF sampled MTF vector $\vec{r}$ 109 (209, 309) based on CSIR 115.

Figure 7:
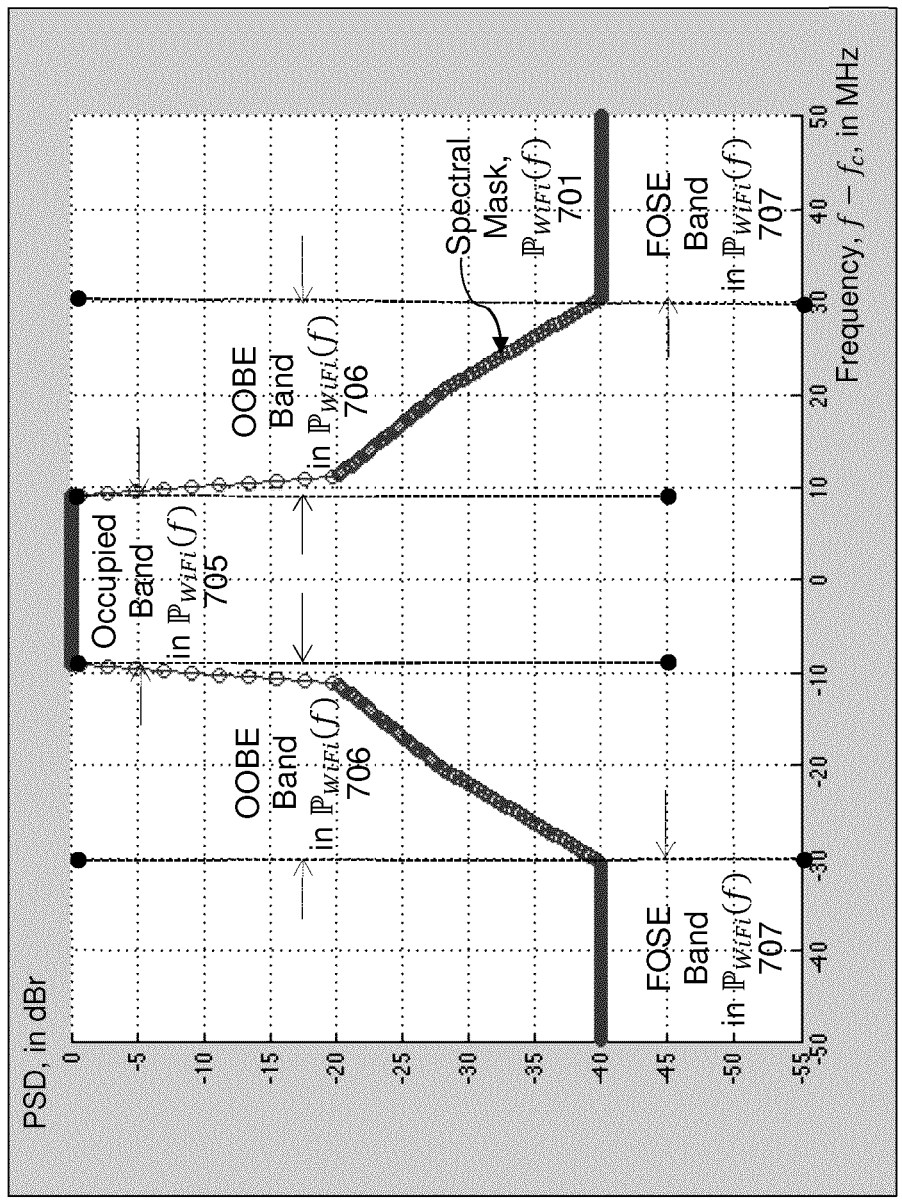

FIG. 7 shows a spectral mask, $\mathbb{P}_{WiFi}(f)$, 701 in dBr versus frequency, f–$f_c$, as an example (among many) of a mask, where $f_c$. is the carrier frequency. The selected mask, $\mathbb{P}_{WiFi}(f)$, is designated for the IEEE802.11 (also known as WiFi) WLAN mask for a 20 MHz band. The mask, $\mathbb{P}_{WiFi}(f)$, 701 contains three distinct (non-overlapping) spectral parts: 1. the Occupied Band 705, 2. the Out-of-Band Emissions (DOBE) Band 706, and 3. the Far Out Spurious Emmisions (FOSE) Band 707. Many other mask constraints are available depending on the standard, frequency band and jurisdiction. While different, all masks must generally contain three distinct spectral parts: Occupied Band 705, DOBE Band 706 and FOSE Band 707, similar to the ones described above for $\mathbb{P}_{WiFi}(f)$ 701.

Figure 8:
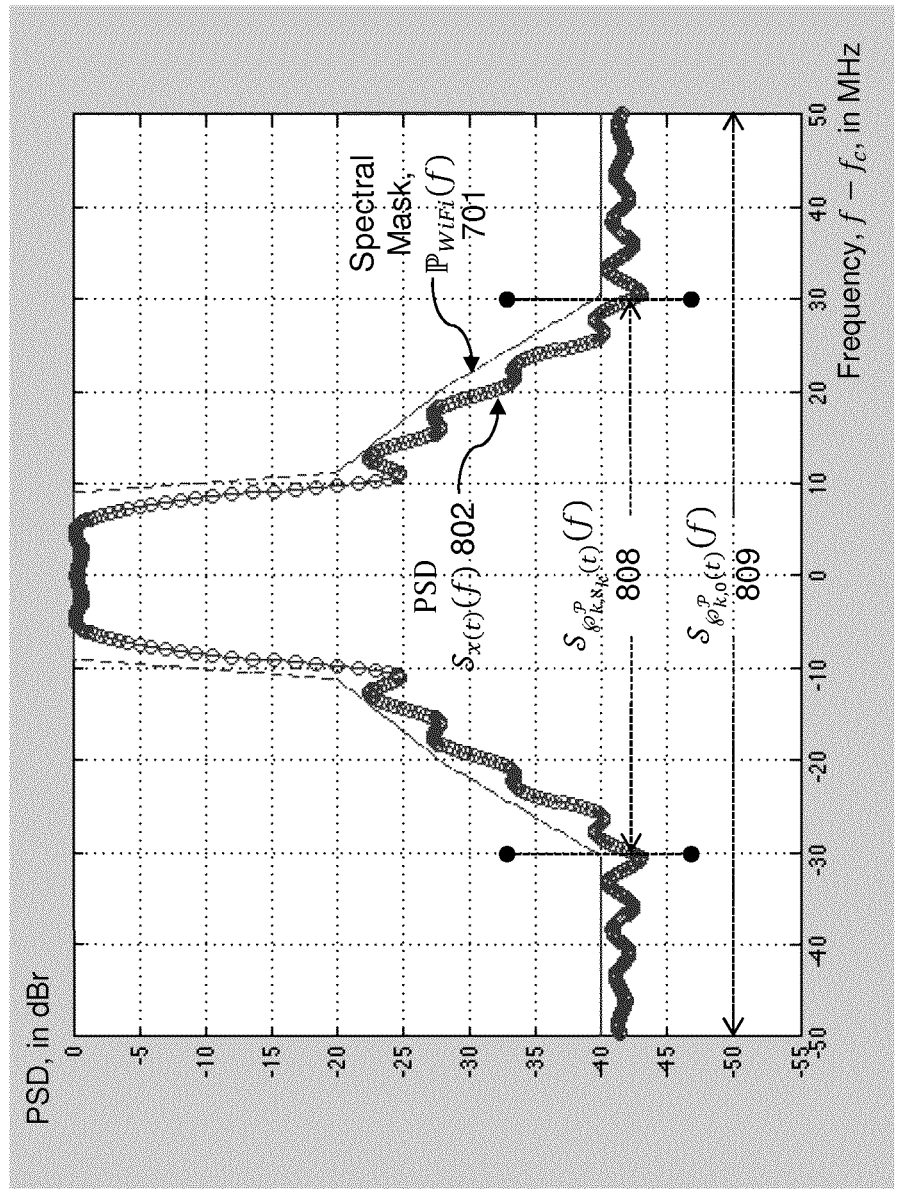

FIG. 8 shows the PSD, $\mathcal{S}_{x(t)}(f)$ 802, in dBr versus frequency, f–$f_c$, of the MTF signal, x(t) 105 (205, 305), where $f_c$. is the carrier frequency. The MTF signal, x(t) 105 (205, 305), is designed in an attempt to match its PSD, $\mathcal{S}_{x(t)}(f)$ 802, with the spectral mask, $\mathbb{P}_{WiFi}(f)$ 701, in FIG. 7 as much as possible, however, without exceeding it. The PSD $\mathcal{S}_{x(t)}(f)$ 802, contains two distinct spectral parts:

$\mathcal{S}_{\wp^p_{k,\aleph_k}(t)}(f)$ 808, which is the PSD of $\vec{\wp}^p_{k,\aleph_k}(f)$, to be matched with both the Occupied Band 705 and the DOBE Band 706 of the spectral mask, $\mathbb{P}_{WiFi}(f)$ 701, as much as possible, but without exceeding it.

$\mathcal{S}_{\wp^p_{k,0}(t)}(f)$ 809, which is the PSD of $\vec{\wp}^p_{k,0}$, to be matched with the FOSE Band 707 of the spectral mask, $\mathbb{P}_{WiFi}(f)$ 701, as much as possible, but without exceeding it.

Figure 9:
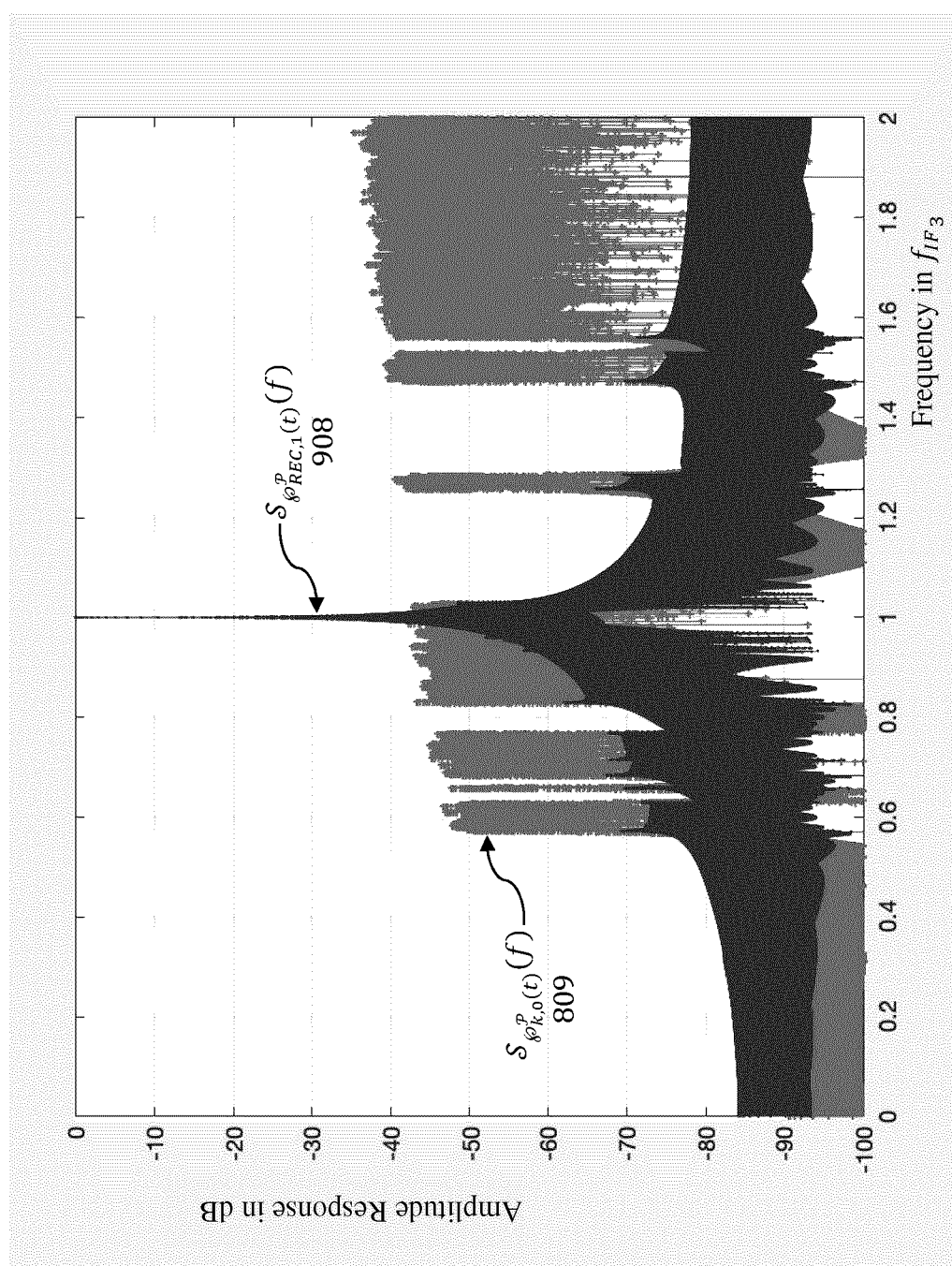

FIG. 9 displays $\mathcal{S}_{\wp^p_{k,\aleph_k}(t)}(f)$ 808 for MTF$_3$ with a null at the restricted bands as well as across |f|≤2 GHz, when $\vec{\wp}^p_{k,\aleph_k}$ is selected as $\vec{\wp}^p_{REC,1}$ with a PSD $\mathcal{S}_{\wp^p_{REC,1}(t)}$ 908 while $\vec{\wp}^p_{k,0}$ is selected as defined in (17) with a PSD $\mathcal{S}_{\wp^p_{k,0}(t)}(f)$ 809 pre-distorted according to (20). From FIG. 9, one can deduce that it is possible to increase $\mathcal{C}_{MTF}$ arbitrarily by increasing $f_{s_3}$ regardless of the value of $f_c$ where $f_{s_3}$ is the sampling frequency of MTF$_3$.

Figure 10A:
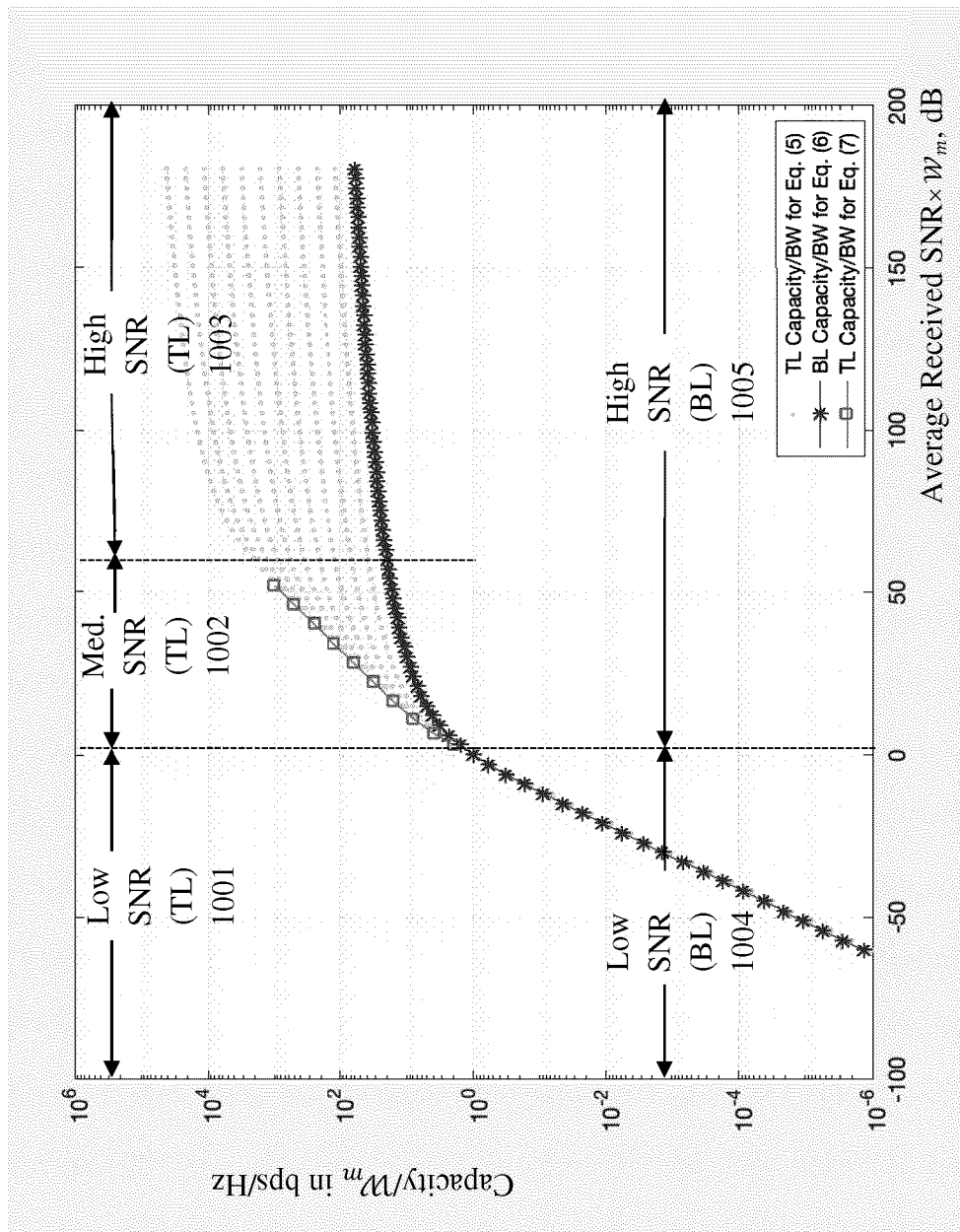

FIG. 10a compares $\mathcal{C}_{TL}/\mathcal{W}_m$ in (5) (shown with ".") markers) with $\mathcal{C}_{BL}/\mathcal{W}_m$ in (6) (shown with "*" markers) when $r=r_{BL}=1$, $d=K=1$ and the $k^{th}$ column, $\{h_{Ch}\}_k$ of $h_{Ch}$ corresponds to a rectangular pulse $\forall k$. In FIG. 10a, $\mathcal{C}_{TL}/\mathcal{W}_m$ in (5) is illustrated as a number of curves, each curve corresponding to a value of $N_{min}$. The selected values are $N_{min}=1, 2, 4, \ldots, 1024$, with $N_{min}=1$ coinciding with $\mathcal{C}_{BL}/\mathcal{W}_m$ in (6). $\mathcal{C}_{BL}/\mathcal{W}_m$ in (6) contains a "Low" SNR region 1004 and a "High" SNR region 1005. Similarly, $\mathcal{C}_{TL}/\mathcal{W}_m$ in (5) contains a "Low" SNR region 1001 and a "High" SNR region 1003. Unlike $\mathcal{C}_{BL}/\mathcal{W}_m$ in (6), $\mathcal{C}_{TL}/\mathcal{W}_m$ in (5) also contains a medium SNR region 1002, denoted as "Med. SNR" in FIG. 10a where doubling $\mathcal{C}_{TL}/\mathcal{W}_m$ in (5) requires a fixed multiple increase in $$\frac{\Lambda_k r}{N_{min}} \frac{\mathcal{A} K \mathfrak{p}}{N_o \mathcal{W}_m}$$

since its contribution towards $\mathcal{C}_{TL}$ is mostly linear.

Figure 10B:
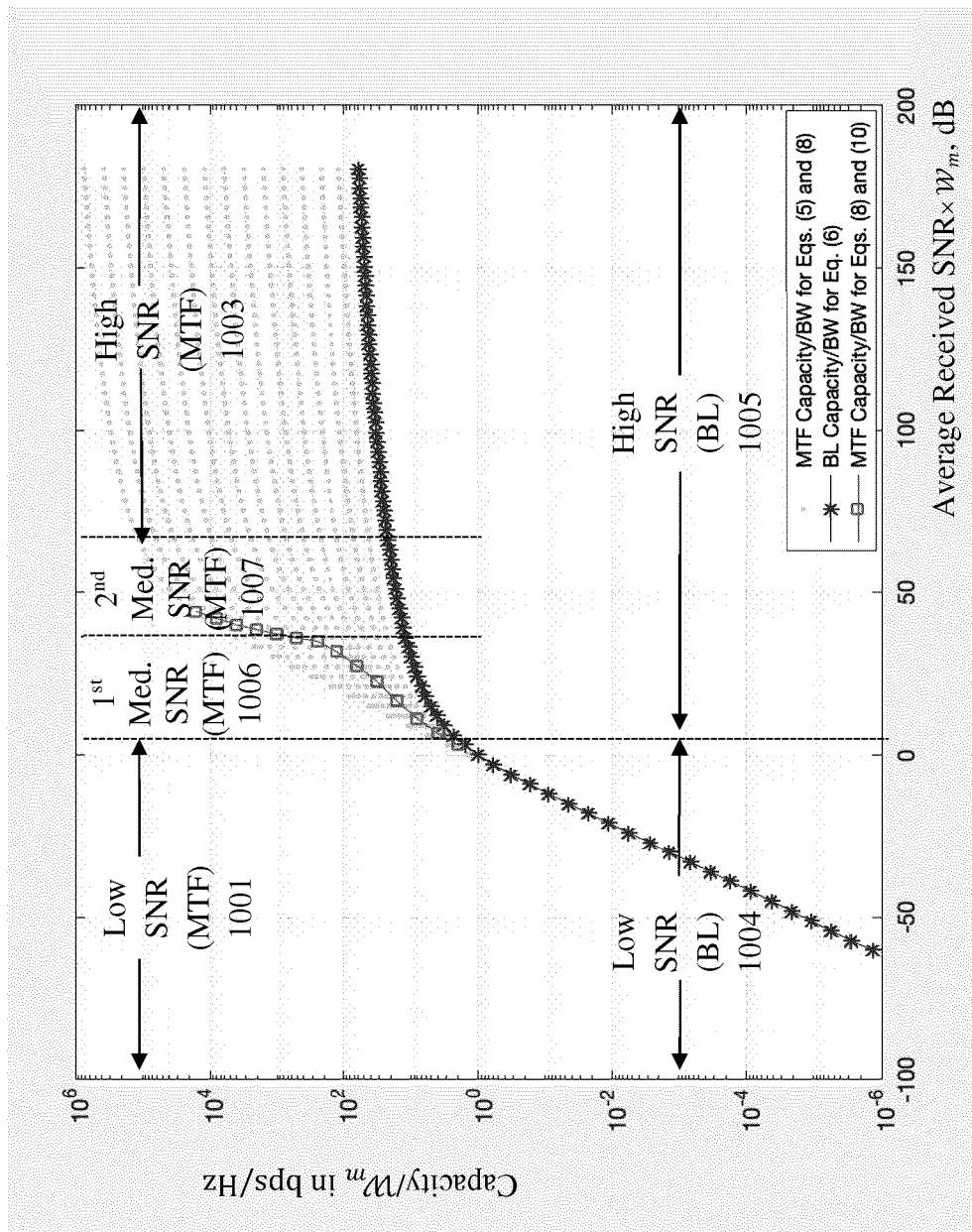

FIG. 10b shows that based on (10), $\mathcal{C}_{MTF}$ consists of two medium SNR regions 1006, 1007. As N increases, doubling $\mathcal{C}_{MTF}$ initially requires increasing the SNR by a fixed multiple of $2^{2\aleph}$, which is the first medium SNR region 1006, referred to as "$1^{st}$ Med. SNR" in FIG. 10b. Then, later on it requires increasing the SNR by a fixed multiple of 2, which is the second medium SNR region 1007, referred to as "$2^{nd}$ Med. SNR". FIG. 10b compares $\mathcal{C}_{MTF}/\mathcal{W}_m$ based on (10) with $\mathcal{C}_{BL}/\mathcal{W}_m$ in (6), where $r=r_{BL}=1$, $\aleph=1$, $d=K=1$ and $\vec{\wp}_{k,\aleph}$ in (8) is a rectangular pulse with $\vec{\wp}_{k,0}$ in (8) 30dBr below $\vec{\wp}_{k,\aleph}$. In FIG. 10b, $\mathcal{C}_{MTF}/\mathcal{W}_m$ without Constraint 3 is illustrated as a number of curves (with "." markers), each curve corresponding to a value of $N_{min} \cdot \mathcal{C}_{MTF}/\mathcal{W}_m$ with Constraint 3 is illustrated as a number of points (with "square" markers), each point corresponding to a value of $N_{min}$. FIG. 10b shows that indeed Constraint 3 maximizes $\mathcal{C}_{MTF}/\mathcal{W}_m$ in both medium SNR regions 1006, 1007.

FIG. 11a shows an embodiment of h 1101 as a block toeplitz matrix. The sup-matrix $$\begin{bmatrix} h_{Basic} \\ 0_{d(L-1) \times K} \end{bmatrix} \in \mathbb{C}^{M \times K}$$

is used as a building block of h 1101 where $h_{Basic} \in \mathbb{C}^{N \times K}$ in FIG. 11a comprises $N_d$ sub-blocks with the first $$\left\lfloor \frac{N}{d} \right\rfloor$$

sub-blocks consisting of $d$ rows each, while the last sub-block consisting of $d'$ rows, i.e. $h_{Basic}=[h_{Basic,1} \ldots h_{Basic,N_d}]^T$ with $h_{Basic,1} \in \mathbb{C}^{d \times K}$ 1102 and $h_{Basic,N_d} \in \mathbb{C}^{d' \times K}$ 1103, where $$d' \triangleq N \text{ modulo } (d), N_d \triangleq \left\lceil \frac{N}{d} \right\rceil$$

is the ceiling function, $$\left\lfloor \frac{N}{d} \right\rfloor$$

is the floor function and $[.]^T$ denotes a transpose operation.

FIG. 11b shows an embodiment of $h_{MTF}$ 1104 as a block toeplitz matrix, where the K TUs 316, 318 are replaced by one equivalent TU 314 with one equivalent $h_{MTF}$ 1104. The sub-matrix $$\vec{h}_{MTF} \triangleq \begin{bmatrix} h_{B\_MTF} \\ 0_{d(L-1) \times K} \end{bmatrix} \in \mathbb{C}^{M \times K}$$

is used as a building block of $h_{MTF}$ 1104 where $h_{B\_MTF}$ in FIG. 11b comprises $N_d$ sub-blocks with the first $$\left\lfloor \frac{N}{d} \right\rfloor$$

sub-blocks consisting of $d$ rows each, while the last sub-block consisting of $d'$ rows, i.e.

$$h_{B\_MTF} = [h_{B\_MTF,1} \ldots h_{B\_MTF,N_d}]^T$$

with $h_{B\_MTF,1} \in \mathbb{C}^{d \times K}$ 1105 and $$h_{B\_MTF,N_d} \in \mathbb{C}^{d' \times K}$$

1106.

FIG. 12a displays an embodiment for implementing equations (8) and (9), Equation (9)

convolves $\vec{h}_{1,k}$ 1201 with $\vec{g}_{1,k}$ 1203 using a circular convolution, denoted by "$\circledcirc$" 1202, and convolves $\vec{h}_{\aleph_k,k}$ 1204 with $\vec{g}_{\aleph_k,k}$ 1206 using a circular convolution, denoted by "$\circledcirc$" 1205, then, it performs $\aleph_k -1$ linear convolution operations, $(\vec{h}_{1,k} \circledcirc \vec{g}_{1,k})$ 1215 * ... *($\vec{h}_{\aleph_k,k} \circledcirc \vec{g}_{\aleph_k,k}$) 1216, using a linear convolution operator, denoted by "*" 1207, in order to produce $\vec{\wp}_{k,\aleph_k}$ 1208.

Equation (8) adds $\vec{\wp}_{k,\aleph_k}$ 1208 that is obtained from equation (9) with $\vec{\wp}_{k,0}$ 1209 using an adder denoted by "+" 1210 in order to produce $\{h_{B\_MTF}\}_k$ 1308.

FIG. 12b displays a preferred embodiment for implementing equations (8) and (9) where all $\vec{h}_{l,k}$ $\forall l$ 1201, 1204 in FIG. 12a are selected as $\vec{h}_{REC,l,k}$ 1212, 1213. In this case, $\vec{\wp}_{k,\aleph_k}$ 1208 in (8) is denoted as $\vec{\wp}_{REC,\aleph_k}$ 1214.

Figure 13:
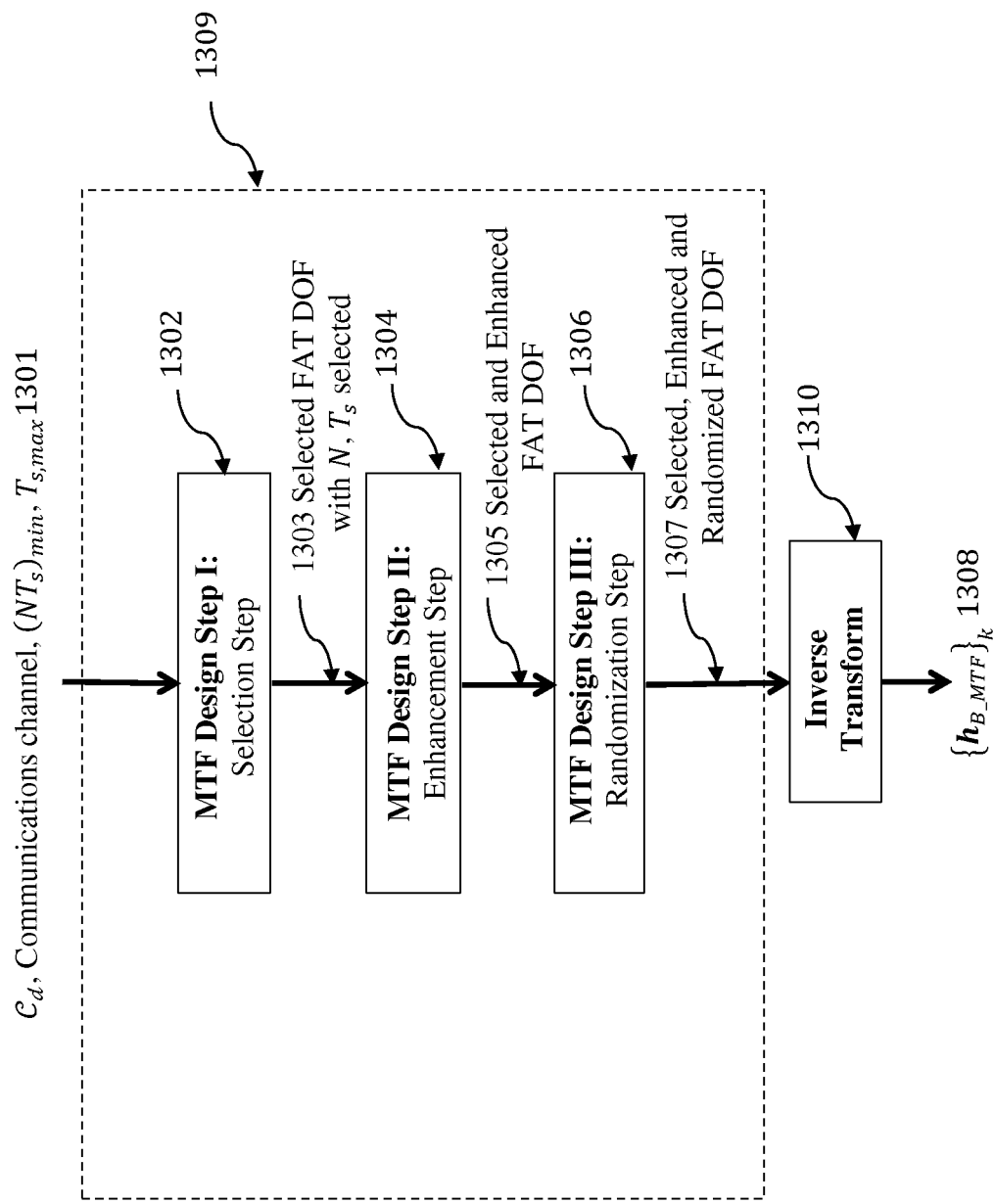

FIG. 13 displays a preferred embodiment 1309 for implementing MTF Design Steps I-III, which designs $\{h_{B\_MTF}\}_k$ 1308 based on Theorem III with the goal of achieving a desired channel capacity, $\mathcal{C}_d$, for a communications channel with $(NT_s)_{min}$ and $T_{s,max}$ 1301 defined MTF Design Step I 1302: This step is referred to as the selection step 1302. It accepts $\mathcal{C}_d$ $N_{min}$ and $T_{s,max}$ 1301, and generates the N selected FAT DOF 1303.

MTF Design Step II 1304: This step is referred to as the enhancement step 1304. It accepts the N selected FAT DOF 1303, and generates the N selected and enhanced FAT DOF 1305.

MTF Design Step III 1306: This step is referred to as the randomization step 1306. It accepts the N selected and enhanced FAT DOF 1305, and generates the N selected, enhanced and randomized FAT DOF 1307.

The N selected, enhanced and randomized FAT DOF 1307 are used to form the N elements of the $k^{th}$ column, $\{h_{B\_MTF}\}_k$ 1308, of $h_{B\_MTF}$ using an inverse transform 1310.

5. DETAILED DESCRIPTION OF INVENTION

5.1 TL Systems

An information vector, $\vec{\alpha} \in \mathbb{C}^{Q \times 1}$ 101, 201, 301, consisting of Q (possibly FEC coded) information symbols, can be transmitted by one or several active transmitters, Tx 104, 204, 304, across a communications channel 106, 306, 406 by converting $\vec{\alpha}$ 101, 201, 301 into a vector, $\vec{\beta}$ 103, 203, 303, defined as $$\vec{\beta} \triangleq h\vec{\alpha} \qquad (1)$$

using a matrix, $h \in \mathbb{C}^{M \times Q}$ 1101, where $\vec{\beta} \in \mathbb{C}^{M \times 1}$ 103, 203, 303 consists of samples, each of duration $T_s$ for a total duration for $\vec{\beta}$ of $MT_s$. In this disclosure, we select h 1101, to be block toeplitz, i.e. h 1101 is defined as $$h \triangleq toep_d\{\vec{h}\} \qquad (2)$$

where $toep_d\{\vec{h}\}$ is an operator, which forms h 1101 by repeatedly replicating the sub-matrix $\vec{h}$ to the right L−1 times, while cyclically shifting $\vec{h}$ down by d rows for every single replica to the right, with $$L \triangleq \lceil Q/K \rceil,$$

defined as the ceiling of Q/K. $\vec{h} \in \mathbb{C}^{M \times K}$ is defined as $$\vec{h} \triangleq \begin{bmatrix} h_{Basic} \\ 0_{d(L-1) \times K} \end{bmatrix} \text{ where } h_{Basic} \in \mathbb{C}^{N \times K}$$

is referred to as the basic building block, while $0_{d(L-1) \times K}$ is the all zero $d$ (L−1)×K matrix, with $d \leq N$ and $$M \triangleq N + d(L-1).$$

Interpretation of h 1101: Since each column of h 1101 is responsible for transporting one information symbol in $\vec{\alpha}$ 101, 201, 301, therefore, $\vec{\beta}$ 103, 203, 303 in (1) can model the output of a K-user TL system with spreading gain N<∞ with a number, $K_b$, of desired transmitters (Txs) intended for a receiver, Rx 108, 308, and a number, $K_i$, of interfering Txs 204, s.t. $K = K_b + K_i$. The $k^{th}$ active Tx 104, 204, 304 transmits a vector $\vec{\beta}_k$, which transports the set of L symbols, $\{\alpha_k, \alpha_{k+K}, \ldots, \alpha_{k+(L-1)K}\}$, after converting $\vec{\alpha}_k$ into a continuous-time signal, $x_k(t)$, of finite duration $MT_s$, with $T_s$ the duration of one sample in $\vec{\beta}$ 103, 203, 303.

Theorem I assumes that:

1. The $k^{th}$ Tx 104, 204, 304 transmits $x_k(t)$ 105, 205, 305 subject to Constraint 1:

$$\text{Constraint 1: } \int_{-\infty}^{\infty} S_{x_k(t)}(f) df \leq \mathfrak{p} \; \forall k$$

where $\mathfrak{p}$ is the average allocatable transmit power at any Tx 104, 204, 304 and $S_{x_k(t)}(f)$ 802 is the Power Spectral Density (PSD) of $x_k(t)$ 105, 205, 305.

2. The $k^{th}$ Tx 104, 204, 304 transmits $x_k(t)$ 105, 205, 305 using a single antenna across a communication channel where it is received at Rx 108, 208, 308 using a single antenna. The received signal, y(t), is then sampled at Rx 108, 208, 308 at a sampling frequency $$f_s \triangleq 1/T_s,$$

to form a discrete-time signal $\vec{r} \in \mathbb{C}^{\mathcal{M} \times 1}$ defined as $$\vec{r} \triangleq h_{Ch}\vec{\alpha} + \vec{w} \qquad (3)$$

where $h_{Ch} \in \mathbb{C}^{\mathcal{M} \times Q}$ corresponds to h 1101 after including the effects of the channel 106, 306, 406 such as replacing M by a number $\mathcal{M} \geq M$, and $\vec{w} \in \mathbb{C}^{\mathcal{M} \times 1}$ models the WGN. We refer to the combination of the TL system and channel as a TL channel.

Theorem I: The capacity, $\mathcal{C}_{TL}$, of the TL channel corresponding to $h_{Ch}$ in (3), subject to Constraint 1, is $$C_{TL} = \frac{1}{MT_s} \sum_{k=1}^{rank(h_{Ch})} \log_2\left(1 + \Lambda_k \frac{\mathcal{A}K\mathfrak{p}}{N_0 f_s}\right) bps \qquad (4)$$

where $N_0/2$ is the two-sided PSD of the WGN, $\mathcal{A}$ is the average attenuation in power across the channel, and $\Lambda_k$ is the $k^{th}$ squared singular value of a normalized $h_{Ch}$ s.t. its $k^{th}$ column, $\{h_{Ch}\}_k$, has on average an L2-norm, which equals $d \; \forall k$.

Importance of Theorem I: $\mathcal{C}_{TL}$ in (4) consists of several regions, which depend on the average received TL SNR, $$\frac{\overline{\mathcal{A}} K \mathfrak{p}}{\mathbb{N}_o f_s}.$$

Similar to the capacity, $C_{BL}$, of a BL system, which consists of a low SNR region 1004 and a high SNR region 1005, $C_{TL}$ in (4) also consists of a low SNR region 1001 and a high SNR region 1003. Unlike BL systems, $C_{TL}$ in (4) also contains a new medium SNR region 1002, when a number, $\mathfrak{n}$, of the terms, $$\Lambda_k \frac{\overline{\mathcal{A}} K \mathfrak{p}}{\mathbb{N}_o f_s},$$

in (4) are $$\ll 1 \text{ s.t. } \log_2\left(1 + \Lambda_k \frac{\overline{\mathcal{A}} K \mathfrak{p}}{\mathbb{N}_o f_s}\right) \approx \log_2 e \Lambda_k \frac{\overline{\mathcal{A}} K \mathfrak{p}}{\mathbb{N}_o f_s}.$$

When $C_{TL}$ is in the low SNR region 1001, $\mathfrak{n}$ =rank ($h_{Ch}$). When $C_{TL}$ is in the high SNR region 1003, $\mathfrak{n}$ =0. When $C_{TL}$ is in the medium SNR region 1002, $0 < \mathfrak{n} \leq$ rank ($h_{Ch}$).

Given that some of the communication channels in this disclosure are to be constrained by a spectral mask, Theorem I must be modified to include a mask constraint. First, we define the bandwidth (BW) of $x_k(t)$, then, introduce the mask constraint.

Definition of the BW of $x_k(t)$ 105, 205, 305: Since $x_k(t)$ 105, 205, 305 is TL, its PSD, $\mathcal{S}_{x_k(t)}(f)$ 802, exists over the entire frequency domain $f \in \{-\infty, \infty\}$, allowing for numerous definitions of BW to exist. In this disclosure, we adopt the same definition of BW as the one adopted by the International Telecommunication Union (ITU), which defines transmitter spectrum emissions as falling into three distinct bands: (a) Occupied band 705 emission with a BW $\mathcal{W}$; (b) Out-Of-Band-Emission (DOBE) band 706 with a BW $\mathcal{W}_{OOBE}$; and (c) Far-Out-Spurious-Emission (FOSE) band 707 with an allowable power level $$\leq \frac{1}{\mathcal{R}}.$$

By adopting the same definition for BW as the ITU, we select the BW, $\mathcal{W}_{TL}$, of the TL system to be defined as the BW, $\mathcal{W}$, of the occupied band 705.

Spectral Mask Constraint 701: Some systems considered in this disclosure are constrained by a spectral mask, $\mathbb{P}_{Mask}(f)$ 701. In this case, $x_k(t)$ 105, 205, 305 is subject to Constraint 2:

Constraint 2: $\mathcal{S}_{x_k(t)}(f) \leq \daleth \mathbb{P}_{Mask}(f) \ \forall f, \forall k$ where $\daleth$ is a normalization constant, which depends on $\mathfrak{p}$, $\mathbb{P}_{Mask}(f)$ 701 and $h$ 1101. According to the ITU, $\mathcal{W}$ must be selected $\leq \mathcal{W}_m$ where $\mathcal{W}_m$ is the BW of $\mathbb{P}_{Mask}(f)$ 701.

This implies that $\mathcal{W}_{TL}$ must be selected $\leq \mathcal{W}_m$ as well. For this reason, we define in this disclosure an overhead factor, $$r \triangleq \mathcal{W}_{TL} N T_s \geq 1,$$

as the overhead, both in time and in frequency, which is required for $x_k(t)$ 105, 205, 305 to comply with Constraint 2. It is selected such that $\mathcal{W}_{TL} \leq \mathcal{W}_m$ or equivalently, N is selected $$\text{s.t. } N \geq N_{min} \triangleq \frac{r}{\mathcal{W}_m T_s}.$$

Under Constraints 1-2, $C_{TL}$ in (4) can be expressed as $$C_{TL} = \frac{\mathcal{W}_m}{r} \frac{N_{min}}{M} \sum_{k=1}^{rank(h_{Ch})} \log_2\left(1 + \frac{\Lambda_k r}{N_{min}} \frac{\overline{\mathcal{A}} K \mathfrak{p}}{\mathbb{N}_o \mathcal{W}_m}\right) bps \quad (5)$$

Similarly, under Constraints 1-2, a BL system, of fixed BW, $\mathcal{W}_{BL}$, selected as $\mathcal{W}_{BL} = \mathcal{W}_m$, has a BL capacity, $C_{BL}$, given as $$C_{BL} = \frac{\mathcal{W}_m}{r_{BL}} \log_2\left(1 + \frac{\overline{\mathcal{A}} K \mathfrak{p}}{\mathbb{N}_o \mathcal{W}_m}\right) bps \quad (6)$$

where $r_{BL}$ is defined as the overhead factor, both in time and in frequency, which is required for the BL system to comply with Constraint 2. When $$\frac{\overline{\mathcal{A}} K \mathfrak{p}}{N_o \mathcal{W}_m} > 1,$$

(6) implies that doubling $C_{BL}$, with a fixed BW, requires a geometric multiple increase in $$\frac{\overline{\mathcal{A}} K \mathfrak{p}}{\mathbb{N}_o \mathcal{W}_m}$$

since its contribution towards $C_{BL}$ is logarithmic.

FIG. 10a compares $C_{TL}/\mathcal{W}_m$ in (5) (shown with ".") markers) with $C_{BL}/\mathcal{W}_m$ in (6) (shown with "*" markers) versus the average received SNR that is normalized w.r.t. $\mathcal{W}_m$, when $r = r_{BL} = 1$, $d = K = 1$ and the $k^{th}$ column, $\{h_{Ch}\}_k$ of $h_{Ch}$ corresponds to a rectangular pulse $\forall k$. In FIG. 10a, $C_{TL}/\mathcal{W}_m$ in (5) is illustrated as a number of curves, each curve corresponding to a value of $N_{min}$. The selected values are $N_{min}$=1, 2, 4, . . . , 1024, with $N_{min}$=1 coinciding with $C_{BL}/\mathcal{W}_m$ in (6). Similar to $C_{BL}/\mathcal{W}_m$ in (6), $C_{TL}/\mathcal{W}_m$ in (5) contains a "Low" SNR region 1001 and a "High" SNR region 1003. Unlike $C_{BL}/\mathcal{W}_m$ in (6), which contains a low SNR region 1004, and a high SNR region 1005, $C_{TL}/\mathcal{W}_m$ in (5) also contains a medium SNR region 1002, denoted as "Med. SNR" in FIG. 10a where doubling $\mathcal{C}_{TL}/\mathcal{W}_m$ in (5) requires a fixed multiple increase in $$\frac{\Lambda_k r}{N_{min}} \frac{\mathcal{A}Kp}{\mathbb{N}_o \mathcal{W}_m}$$

since its contribution towards $\mathcal{C}_{TL}$ is mostly linear.

Interpretation of FIG. 10a: The medium SNR region 1002 is created in $\mathcal{C}_{TL}$ in (5) when the average received BL SNR $$\frac{\mathcal{A}Kp}{\mathbb{N}_o \mathcal{W}_m},$$

is >1 while $$\frac{\mathcal{A}Kp}{\mathbb{N}_o \mathcal{W}_m} \frac{\Lambda_k r}{N_{min}}$$

is <<1. In other words, $$\frac{\Lambda_k r}{N_{min}}$$

must be much smaller than $$\frac{\mathcal{A}Kp}{\mathbb{N}_o \mathcal{W}_m}$$

in order to create the medium SNR region 1002. The source for having $\Lambda_k$ small and $N_{min}$ large while keeping $r < \infty$ is having an arbitrarily large number of DOF, while complying with Constraint 2. In a practical design requiring finite latency, all DOF must have a Finite Access Time (FAT), or equivalently, the time it takes to access any such DOF is finite. We refer to such DOF as FAT, and observe that only TL systems have an arbitrarily large number of FAT DOF in their high frequency components, while BL systems have only a finite number of FAT DOF since they are not allowed to contain high frequency components.

Attribute of h for $r$ to be $<\infty$: Given that some of the communication channels 106, 306, 406 in this disclosure are to be constrained by a spectral mask 701 with $r < \infty$, it is imperative to analyze $S_{x_k(t)}(f)$ 801. An important attribute of h 1101, which affects the spectral decay of $S_{x_k(t)}(f)$ 801, is the Degree of Differenciability (DOD), $\aleph_k$, of the $k^{th}$ column, $\{h\}_k$ of h 1101, defined as the number of times $\{h\}_k$ can be differenced in time until a Dirac delta impulse, $\delta$, appears. Mathematically, this implies that $$\aleph \triangleq \min_{\{\vec{\Delta}_k^n\}_l = \delta} \{n\}$$

where $\{\vec{\Delta}_k^n\}_l$ is the $l^{th}$ element in the differencing vector, $\vec{\Delta}_k^n$, of order n, corresponding to $\{h\}_k$, and defined as $$\{\vec{\Delta}_k^n\}_l \triangleq \{\vec{\Delta}_k^{n-1}\}_{l+1} - \{\vec{\Delta}_k^{n-1}\}_l \text{ for } l \in \{1, \ldots, N-n\}, n \in \mathbb{I}$$

with initial condition:

$$\{\vec{\Delta}_k^0\}_l \triangleq \{h\}_{k,l}, l \in \{1, \ldots, N-1\}.$$

Examples of $\aleph$:
When $\{h\}_k$ is a TL rectangular pulse, $\aleph_k=1$.
When $\{h\}_k$ is one lobe of a sine wave, $\aleph_k=2$.
When $\{h\}_k$ is a pseudo-noise (PN) sequence, $\aleph_k=0$.
The following 2 DOD properties are used below:
DOD Property I: When $\{h\}_k$ is the sum of two TL vectors, $\{h_1\}_k$ and $\{^2\}_k$, i.e. $\{h\}_k=\{h_1\}_k+\{h_2\}_k$, with respective DOD, $\aleph_{k,1}$ and $\aleph_{k,2}$, its resulting DOD, $\aleph_k$, is asymptotically equal to $$\lim_{N \to \infty} \aleph_k = \min(\aleph_{k,1}, \aleph_{k,2}).$$

DOD Property II: When $\{h\}_k$ is the linear or circular convolution between two TL vectors, $\{h_1\}_k$ and $\{h_2\}_k$ with respective DOD, $\aleph_{k,1}$ and $\aleph_{k,2}$, its resulting DOD, $\aleph_k$, is: $\aleph_k=\aleph_{k,1}+\aleph_{k,2}$ Theorem II derives the slope of the medium SNR region 1002 as a function of the DOD of $h_{Ch}$.

Theorem II: Doubling $\mathcal{C}_{TL}$ in (4) across its medium SNR region 1002 requires increasing $$\frac{\mathcal{A}Kp}{\mathbb{N}_o f_s}$$

by a fixed multiple of $2^{2\aleph_k}$ where $\aleph_k$ is the DOD of $h_{Ch}$.

The following constraint derives the modulation, which maximizes $\mathfrak{n}$, when using a Minimum Mean Square Error with Successive Interference Cancellation (MMSE-SIC) detector 110, 210, 310 at Rx 108, 208, 308, selected for its low complexity and its asymptotic optimality under certain conditions. This constraint maximizes $\mathcal{C}_{TL}$ in the medium SNR region 1002.

Modulation Constraint: It is possible to show that minimizing the arithmetic mean of the MMSE at Rx 108, 208, 308 is equivalent to maximizing $$\frac{d}{dSNR_k} \log_2\left(1 + \frac{SNR_k}{p_k}\right) \forall k$$

where $SNR_k$ is the received normalized SNR corresponding to $\{h_{Ch}\}_k$ while $$\frac{1}{\mathcal{P}_k}$$

is its multiuser efficiency. Unlike water-filling, which deals with parallel channels, the solution for such optimization is $$\frac{SNR_k}{\mathcal{P}_k} = 1 \ \forall k.$$

This implies that the modulation of choice for the elements of $\vec{\alpha}$ corresponds to loading each DOF with about 1 bit of information. In comparison, the low SNR regions 1001, 1004 correspond to loading <1 bit/DOF, while the high SNR regions 1003, 1005 typically correspond to loading >1 bit/DOF. When $\mathcal{A}_k \neq \bar{\mathcal{A}}$ for some k, we use instead:

$$\min_k \{SNR_k\} \geq \max_k \{\mathcal{P}_k\}. \qquad \text{Constraint 3}$$

Theorem III modifies Theorem I to include a mask constraint 701 and a modulation constraint.

Theorem III: The capacity, $\mathcal{C}_{TL}$, of the TL channel corresponding to $h_{Ch}$ in (3), subject to Constraints 1-3, with K≤d and with $\aleph_k > 0$ is $$C_{TL} = \frac{\mathcal{W}_m}{r} \frac{N}{M} \sum_{k=1}^{Q} \log_2\left(1 + \frac{SNR_k}{\mathcal{P}_k}\right) bps \qquad (7)$$

where $\mathcal{p}_k$ is asymptotically $$\propto \frac{1}{r} K^{2\aleph_k - 1} N_d^{2\aleph_k}$$

as N>>1 with $$N_d \triangleq \lceil N/d \rceil,$$

the ceiling of $N/d$, and $N \geq N_{min}$, using an MMSE-SIC detector 110, 210, 310 at Rx 108, 208, 308.

Importance of Theorem III: In FIG. 10a $\mathcal{C}_{TL}/\mathcal{W}_m$ in (7) is illustrated as a number of points (shown with "square" markers), each corresponding to a value of $N_{min}$. FIG. 10a confirms that Constraint 3 maximizes $\mathcal{C}_{TL}$ in the medium SNR region. Based on (7) and on Constraint 3, $$\lim_{L \to \infty} C_{TL} \geq \frac{\mathcal{W}_m}{r} \frac{NK}{d}.$$

Therefore, doubling $$\lim_{L \to \infty} C_{TL}$$

by doubling $$\frac{N}{d},$$

for a fixed $$\frac{\mathcal{W}_m}{r}$$

and K, requires increasing $SNR_k$ by a fixed multiple of $2^{2\aleph_k}$, while doubling $$\lim_{L \to \infty} C_{TL}$$

by doubling K, for a fixed $$\frac{\mathcal{W}_m}{r} \text{ and } \frac{N}{d},$$

requires increasing $SNR_k$ by a fixed multiple of $2^{2\aleph_k - 1}$ when K≤d.

The next section introduces a novel TL system with FAT DOF, referred to as an MTF system.

5.2 MTF Design

Design Problem: h 1101 in (1) is to be designed based on Theorems I and III with the goal of achieving a desired channel capacity, $\mathcal{C}_b$ 1301, for a given channel 106, 306, 406 of BW $\mathcal{W}_m$. Three design steps, MTF Design Steps I-III 1302, 1304, 1306, are shown below, followed by a proposed MTF design implementation. All 3 steps attempt to design h 1101 such that the minimum required average received SNR is minimized for a given desired capacity, $\mathcal{C}_b$ 1301, and for a given BW $\mathcal{W}_m$. This requires designing h 1101 s.t. the set, $\{\Lambda_k\}_{k=1}^{rank(h_{Ch})}$, of squared singular values of $h_{Ch}$ in (3) has a variance that is minimized while complying with Constraint 2.

MTF Design in Solution:

First, we define $$T_{s,max} \triangleq \frac{K}{d \mathcal{C}_b} \geq 1/f_s$$

1301 as a function of K and $d$, which depend on the selected TL channel. For example, when the TL channel has relatively low interference, such as with K=1, one can select the TL system to be with memory, i.e. with $d=1<N$, implying that $$T_{s,max} = \frac{1}{\mathcal{C}_b} \geq 1/f_s \text{ or } f_s \geq \mathcal{C}_b$$

1301. On the other hand, when the TL channel has relatively high interference, i.e. with K>>1, one can select the TL system to be memoryless, i.e. with $d=N$, implying that $$T_{s,max} = \frac{K}{N\,C_b} \geq 1/f_s \text{ or } f_s \geq \frac{N}{K}C_b$$

1301.

MTF Design Step I 1302: For a fixed $T_s \leq T_{s,max}$ 1301, select the number, N 1303, of FAT DOF as $$N \triangleq N_S + N_J,$$

where:
a) $N_S$ is defined as the number of Shaping FAT (S-FAT) DOF 1303 selected such that $N_S \geq N_{min}$ in order to comply with the BW constraint, $\mathcal{W}_{TL} \leq \mathcal{W}_m$, of $\mathbb{P}_{Mask}$(f) 701; and
b) $N_J$ is defined as the number of Interpolating FAT (I-FAT) DOF 1303 obtained through the creation of interpolated sampled frequencies 1303 inside the existing occupied band 705.

Power is taken from existing frequencies and allocated to the newly formed frequencies 1303 s.t. Constraint 1 is preserved. Commonly, $N_J = 0$ since no constraints depend on $N_J$.

MTF Design Step II 1304: Once N 1303 is selected and the newly sampled frequencies are created 1303, $\wp_k$ can be reduced by equalizing the power, $E\{|H_k(\Omega)|^2\}$, across $\Omega \in [-\pi, \pi]$ as much as possible, while preserving Constraint 2, where $H_k(\Omega)$ is the Discrete-Time Fourier Transform (DTFT) of the $k^{th}$ column, $\{h_{Basic}\}_k$, of $h_{Basic}$ 1102, 1103 and $\Omega$ is the normalized frequency. This equalization is defined as taking power from frequency samples 1303 with above average power and allocating it to frequencies 1305 with below average power, thereby preserving Constraint 1. It can be shown using Karamata's inequality that such power allocation reduces the variance of $\{\Lambda_k\}_{k=1}^{rank\,(h_{Ch})}$ hence increasing $\mathcal{C}_{TL}$.

MTF Design Step III 1306: Once N 1303 is selected, the newly sampled frequencies 1303 are created, and the power, $E\{|H_k(\Omega)|^2\}$, across $\Omega \in [-\pi, \pi]$ is equalized 1305 as much as possible, $\wp_k$ can be reduced by selecting the phases of the samples of $H_k(\Omega)$, s.t. the entries 1307 of $h_{Basic}$ 1102, 1103 are zero mean RVs, (ideally) Gaussian. This assignment of the phases in $H_k(\Omega)$ does not affect the power, $E\{|H_k(\Omega)|^2\}$, across $\Omega \in [-\pi, \pi]$, and thus, preserves Constraints 1-2.

Nomenclature: We refer to h 1101 designed based on MTF Design Steps I-III 1302, 1304, 1306, and subject to Constraints 1-3, as an MTF matrix. In this case, we denote h 1101 as $h_{MTF}$ 1104, $h_{Ch}$ as $h_{MTF,Ch}$, $h_{Basic}$ 1102, 1103 as $h_{B\_MTF}$, $\mathcal{C}_{TL}$ in (7) as $\mathcal{C}_{MTF}$ and refer to the combination of the MTF system and of the channel as the MTF channel. $h_{B\_MTF}$ is defined by the building blocks $h_{B\_MTF,1}$ 1105, ..., $h_{B_{MTF},N_d}$ 1106. The $k^{th}$ column $\{h_{B\_MTF}\}_k$ 1308 of $h_{B\_MTF}$ is obtained from $H_k(\Omega)$ using an inverse DTFT 1310.

MTF Design Implementation: An implementation of MTF Design Steps I-III 1302, 1304, 1306 is proposed here where the $k^{th}$ column, $\{h_{B\_MTF}\}_k$ 1308, of $h_{B\_MTF}$, is expressed as a sum:

$$\{h_{B\_MTF}\}_k \triangleq \vec{\wp}_{k,\aleph_k} + \vec{\wp}_{k,0} \qquad (8)$$

of 2 vectors, $\vec{\wp}_{k,\aleph_k}$ 1208 and $\vec{\wp}_{k,0}$ 1209, defined as follows:

Vector I: $\vec{\wp}_{k,\aleph_k} \in \mathbb{C}^{N \times 1}$ 1208 is a pulse vector with a DOD, $\aleph_k > 0$, selected in order for $\{h_{MTF}\}_k$ to comply with the BW constraint, i.e. $\mathcal{W}_{TL} \leq \mathcal{W}_m$ 705. It is formed using $\aleph_k$ linear convolutions (each denoted by '*' 1207):

$$\vec{\wp}_{k,\aleph_k} \triangleq (\vec{h}_{1,k} \circledast \vec{g}_{1,k}) * \ldots * (\vec{h}_{\aleph_k,k} \circledast \vec{g}_{\aleph_k,k}) * \vec{b}_k \qquad (9)$$

between $\aleph_k + 1 > 0$ vectors, with the $l^{th}$ vector, $(\vec{h}_{l,k} \circledast \vec{g}_{l,k})$ 1215, 1216 for $1 \leq \aleph_k$, formed as a circular convolution (denoted by '$\circledast$' 1202, 1205) between a zero mean pseudo-random (PR) vector, $\vec{g}_{l,k} \in \mathbb{C}^{N_l \times 1}$ 1203, 1206 with a DOD=0, and a vector pulse, $\vec{h}_{l,k} \in \mathbb{C}^{N_l \times 1}$ 1201 1204 with a DOD=1; while $\vec{b}_k \in \mathbb{C}^{N_{\aleph+1} \times 1}$ 1215 is a zero mean PR vector with a DOD=0. The first $\aleph_k - 1$ linear convolutions produce $$N_S \triangleq \sum_{l=1}^{\aleph} N_l - \aleph_k + 1 \text{ S-FAT DOF},$$

while the last produces $$N_J \triangleq N_{N+1} - 1 \text{ I-FAT DOF}.$$

Vector II: $\vec{\wp}_{k,0} \in \mathbb{C}^{N_0 \times 1}$ 1209 is a PR vector with a DOD=0 selected s.t. $\{h_{MTF}\}_k$ complies with the FOSE 707 constraint of $\mathbb{P}_{Mask}$(f) 701, i.e. with a power level $$S_{x_k(t)}(f) \leq \frac{1}{\mathcal{R}}$$

in the FOSE band 707. It is possible to generalize $N_0$ so that it is not necessarily equal to N. For example, it is possible to select $N_0 = 0$, implying that $\vec{\wp}_{k,0}$ 1209 is not included in (8), or equivalently $$\{h_{B\_MTF}\}_k \triangleq \vec{\wp}_{k,\aleph_k}.$$

It is also possible to select $N_0 > N$. In this case, $N_0 - N$ zeros must be appended to $\vec{\wp}_{k,\aleph_k}$ 1208 in (9) in order for $\vec{\wp}_{k,\aleph_k}$ 1208 and $\{h_{B\_MTF}\}_k$ to have a total length of $N_0$.

The reasoning behind separating $\{h_{B\_MTF}\}_k$ in (8) into two vectors, $\vec{\wp}_{k,\aleph_k}$ 1208 and $\vec{\wp}_{k,0}$ 1209, is that it is difficult to simultaneously comply with the BW constraint, i.e. with $\mathcal{W}_{TL} \leq \mathcal{W}_m$ 705; and the FOSE 707 constraint, i.e. with $$S_{x_k(t)}(f) \leq \frac{1}{\mathcal{R}}$$

using a single vector with a single DOD. By taking advantage of DOD Property I, summing $\vec{\wp}_{k,\aleph_k}$ 1208 and $\vec{\wp}_{k,0}$ 1209 results in $\{h_{MTF}\}_k$ having a DOD $\aleph_k$, since $\vec{\wp}_{k,0}$ 1209 has a DOD 0.

The reasoning behind using $\aleph_k-1$ circular convolutions 1202, 1205 in $\vec{\wp}_{k,\aleph_k}$ 1208 in (8) is that it is difficult to use a single vector with a single DOD while achieving the following 2 requirements: (1) the entries of $\{h_{B\_MTF}\}_k$ are zero mean RVs; while (2) $\{h_{MTF}\}_k$ complies with the BW constraint that $\mathcal{W}_{TL} \le \mathcal{W}_m$ 705. By taking advantage of DOD Property II, circularly convolving $\vec{h}_{l,k}$ 1201, 1204 with $\vec{g}_{l,k}$ 1203, 1206, produces a vector with a DOD=1 since the DOD for $\vec{g}_{l,k}$ 1203, 1206 is 0, implying that $\vec{\wp}_{k,\aleph_k}$ 1208 has a DOD $\aleph_k$. The pulse, $\vec{\wp}_{k,\aleph_k}$ 1208, is made to comply with $\mathcal{W}_{TL} \le \mathcal{W}_m$ 705 by properly selecting $\aleph_k$ and $r$.

Theorem IV: The MTF channel corresponding to $\{h_{B\_MTF}\}_k$ in (8) with $N_I=0$ under Constraints 1-3, has a capacity, $\mathcal{C}_{MTF}$, identical to $\mathcal{C}_{TL}$ in (7) except $p_k$ is proportional to $$p_k \propto \left( \frac{1 + \frac{N_0}{\lambda \mathcal{R}}}{\frac{1}{c_{K,N,d,\aleph} \frac{1}{r} K^{2\aleph-1} N_d^{2\aleph}} + c_{N_0,0} \frac{rN_0}{\lambda \mathcal{R} N}} \right) \text{ as } N \gg 1 \quad (10)$$

where $c_{K,N,d,\aleph}$ and $c_{N_0,0}$ are the coefficients of proportionality corresponding to $\vec{\wp}_{k,\aleph}$ and $\vec{\wp}_{k,0}$ in (8) respectively, with $$\lambda \triangleq p/\daleth,$$

using an MMSE-SIC detector 110, 210, 310 at Rx 108, 208, 308.

Importance of Theorem IV: Based on (10), $\mathcal{C}_{MTF}$ consists of two medium SNR regions 1006, 1007, as shown in FIG. 10b. As N increases, doubling $\mathcal{C}_{MTF}$ initially requires increasing the SNR by a fixed multiple of $2^{2\aleph_k}$, which is the first medium SNR region 1006, referred to as "$1^{st}$ Med. SNR" in FIG. 10b. Then, later on it requires increasing the average received SNR by a fixed multiple of 2, which is the second medium SNR region 1007, referred to as "$2^{nd}$ Med. SNR" in FIG. 10a. FIG. 10a compares $\mathcal{C}_{MTF}/\mathcal{W}_m$ based on (10) with $\mathcal{C}_{BL}/\mathcal{W}_m$ in (6), where $r = r_{BL} = 1$, $\aleph = 1$, $d = K = 1$ and $\vec{\wp}_{k,\aleph}$ in (8) is a rectangular pulse with $\vec{\wp}_{k,0}$ in (8) 30 dBr below $\vec{\wp}_{k,\aleph}$. In FIG. 10b, $\mathcal{C}_{MTF}/\mathcal{W}_m$ without Constraint 3 is illustrated as a number of curves (with "."  markers), each curve corresponding to a value of $N_{min} \cdot \mathcal{C}_{MTF}/\mathcal{W}_m$ with Constraint 3 is illustrated as a number of points (with "square" markers), each point corresponding to a value of $N_{min}$. FIG. 10b confirms that indeed Constraint 3 maximizes $\mathcal{C}_{MTF}/\mathcal{W}_m$ in both medium SNR regions 1006, 1007.

Under certain conditions, the following asymptotic limits can be reached:
a) When $$\frac{N_0}{\lambda \mathcal{R}} \ll 1,$$

Theorem IV reduces to Theorem III.
b) When $$\frac{N_0}{\lambda \mathcal{R}} \gg 1 \text{ and } c_{N_0,0} \frac{rN_0}{\lambda \mathcal{R} N} \gg \frac{1}{c_{K,N,d,N_k} \frac{1}{r} K^{2N_k-1} N_d^{2N_k}},$$

we have $$\lim_{N_0 \to \infty} p_k = \frac{N}{r} \quad (11)$$

This limit applies to the case when $\mathbb{P}_{Mask}(f)$ 701 corresponds to the IEEE 802.11 WLAN mask, denoted as $\mathbb{P}_{WiFi}(f)$.

c) When $$\frac{N_0}{\lambda \mathcal{R}} \triangleq q \ll 1$$

with q, a constant and $$c_{N_0,0} \frac{rN_0}{\lambda \mathcal{R} N} \gg \frac{1}{c_{K,N,d,N_k} \frac{1}{r} K^{2N_k-1} N_d^{2N_k}},$$

we have $$\lim_{N_0 \to \infty} p_k = \frac{N}{qr} \quad (12)$$

This limit applies to the case when $\mathbb{P}_{Mask}(f)$ 701 corresponds to the 3GPP LTE (E-UTRA) mask, denoted as $\mathcal{W}_{m\_LTE}(f)$.

5.3 MTF Architecture

Section 5.3.1 introduces the constraints that are generally imposed on communication systems such as standard-imposed spectral masks 701, as well as the effects of fading and interference across the communication channel 106, 306, 406. Section 5.3.2 proposes several MTF designs based on the constraints introduced in Section 5.3.1, while Section 5.3.3 introduces an architecture that is suitable for allowing various MTF systems to communicate with each other when co-located while using the same band.

5.3.1 Design Constraints

First, we select 2 important $\mathbb{P}_{Mask}(f)$ 701, namely $\mathbb{P}_{WiFi}(f)$ and $\mathbb{P}_{LTE}(f)$. Then, we model the communication channel 106, 306, 406 and examine its effects on the MTF architecture including the types of interference and restricted bands across such a channel.

Selection of $\mathbb{P}_{Mask}$(f) 107: In order to include Constraint 2 in Design Steps I-III 1302, 1304, 1306, and in order to derive a fair comparison with some of the existing systems, we define $\mathbb{P}_{WiFi}$(f) and $\mathbb{P}_{LTE}$(f):
a) The 3GPP LTE (E-UTRA) mask, $\mathbb{P}_{LTE}$(f), is defined for a 1.4, 3, 5, 10, 15 and 20 MHz BW, as having ≤1% OOBE BW, or equivalently, $\mathcal{W}_m$ must contain ≥99% of the total integrated mean power in $x_k$(t) 105, 205, 305 ∀k.
b) The IEEE 802.11 WLAN mask for a 20 MHz BW is:

$$\mathbb{P}_{WiFi}(f) \triangleq \begin{cases} 0dBr & |f| \leq 9 \text{ MHz} \\ \text{line from } 0dBr \text{ to } -20dBr & 9 \text{ MHz} \leq |f| \leq 11 \text{ MHz} \\ \text{line from } -20dBr \text{ to } -28dBr & 11 \text{ MHz} \leq |f| \leq 20 \text{ MHz} \\ \text{line from } -28dBr \text{ to } -40dBr & 20 \text{ MHz} \leq |f| \leq 30 \text{ MHz} \\ -40dBr & 30 \text{ MHz} \leq |f| \end{cases}$$

In $\mathbb{P}_{WiFi}$(f), the first frequency band, |f|≤9 MHz, corresponds to the occupied band 705 with a bandwidth, $\mathcal{W}_m$ =18 MHz. The middle three frequency bands correspond to DOBE 706 with a bandwidth, $\mathcal{W}_{OOBE}$=42 MHz. The last frequency band, |f|≥30 MHz, correspond to the FOSE band 707 with an infinite bandwidth and a power level $1/\mathcal{R}$ =−40 dBr.

Modeling of the Communication Channel 106, 306, 406: When $$f_s \triangleq 1/T_s \text{ is } \geq 8 \text{ MHz}$$

and $NT_s$≤1 ms, the channel 106, 306, 406 can be modeled as a frequency-selective (FS) slowly fading channel affected by a frequency-dependent path loss (PL) modeled after Friis free-space PL (FSPL) model. Mathematically, such a channel can be modeled as Linear Time-Invariant (LTI) and characterized using a discrete-time random impulse response, $\vec{h}_{Ch}$, of finite length, δN, referred to as the discrete delay spread of the channel. The fading can be modeled either as Rayleigh for a non-LOS channel or as Rician with a strong LOS component for a LOS channel.

Effects of the Selected Channel Model:
1) Mathematically, the main effect of the frequency-selective channel is to linearly convolve each column, $\{h_{MTF}\}_k$, in $h_{MTF}$ 1104 with $\vec{h}_{Ch}$. The outcome of such a convolution is a new MTF matrix, $h_{MTF,Ch} \in \mathbb{C}^{M \times Q}$, defined as $$h_{MTF,Ch} \triangleq toep_d\{\vec{h}_{MTF,Ch}\} \quad (13)$$

where $\vec{h}_{MTF,Ch} \in \mathbb{C}^{\mathcal{M} \times K}$ has $h_{B\_MTF}$ replaced by $h_{B\_MTF,Ch} \in \mathbb{C}^{\mathcal{N} \times K}$ with M replaced by $$\mathcal{M} \triangleq \mathcal{N} + d(L-1),$$

N replaced by $$\mathcal{N} \triangleq N + \delta N - 1$$

and $N_o$ replaced by $$\mathcal{N}_o \triangleq N_o + \delta N - 1.$$

The increase in N and in $N_o$ by δN−1 is equivalent to an increase in the number, $N_\jmath$, of I-FAT DOF in the MTF system by δN. Based on DOD Property II, the linear convolution between $\vec{h}_{Ch}$ and the $k^{th}$ column, $\{h_{MTF}\}_k$, in $h_{MTF}$ 1104 implies that the resulting DOD is equal to the sum between the original DOD, $\aleph_k$, and the DOD, $\aleph_{Ch}$, of the communication channel.

Based on the adopted frequency-selective fading model of the communication channel 106, 306, 406, $\aleph_{Ch}$=0. In other words, the resulting DOD of $h_{MTF,Ch}$, is equal to the original DOD of $h_{MTF}$ 1104 when the communication channel 106, 306, 406 is FS.

2) The communication channel 106, 306, 406 can be equivalently characterized in the frequency domain by the DTFT of $\vec{h}_{Ch}$, also referred to as its Transfer Function (TF), $H_{Ch}(\Omega)$. This implies that the following continuous-frequency product:

$$H_{MTF_k,Ch}(\Omega) \triangleq H_{MTF_k}(\Omega) H_{Ch}(\Omega) \; \forall \, \Omega \in [-\pi, \pi] \quad (14)$$

can replace the linear discrete-time convolution between $\{h_{MTF}\}_k$ and $\vec{h}_{Ch}$ where $H_{MTF_k,Ch}(\Omega)$ is the DTFT of the $k^{th}$ column, $\{h_{MTF,Ch}\}_k$, of $h_{MTF,Ch}$.

3) Friis FSPL model is based on $E\{|H_{Ch}(\Omega)|^2\}$ being inversely proportional to $|\Omega|^2$, i.e.

$$E\{|H_{CH}(\Omega)|^2\} \propto \frac{1}{|\Omega|^2} \; \forall \, \Omega \in [-\pi, 0) \cup (0, \pi] \quad (15)$$

where E{.} denotes expectation w.r.t. $H_{Ch}(\Omega)$ at Ω, assuming it is ergodic. Based on (15), it is possible to see that the FSPL has a DOD equal to 1. In other words, the effect of the FSPL is to increase the original DOD, $\aleph_k$, of $\{h_{MTF}\}_k$ by 1 if the carrier frequency, $f_c$=0, otherwise, the effect of the FSPL on $\aleph_k$ depends on $f_c$.

Based on all effects of the communication channel 106, 306, 406, Theorem III is still valid after replacing $H_{MTF_k}(\Omega)$ by $H_{MTF_k,Ch}(\Omega)$, M by $\mathcal{M}$ and after re-evaluating $\aleph_k$ based on $f_c$. In order to preserve the original DOD, $\aleph_k$, of $h_{MTF}$ 1104 a pre-channel filter 500 is required at Tx 104, 204, 304, which is discussed in Section 5.3.2.

Modeling of Interference: Two types of interference exist across a communication network:
(a) Narrow-Band Interference (NBI), defined as having a width ≤125 MHz; and
(b) Wide-Band Interference (WBI), defined as having a width >125 MHz.

NBI encompasses transmissions from existing systems such as LTE and Wi-Fi systems, and from other MTF systems due to the presence of $\vec{\wp}_{k,\aleph_k}$ 1208, while WBI encompasses transmissions from Ultra-Wide Band (UWB) systems and from other MTF systems due to the presence of $\vec{\wp}_{k,0}$ 1209. Several studies have indicated low utilization of the frequency bands at frequencies >2 GHz as seen in Table I, which displays the average duty cycle versus frequency range ≤7,075 MHz based on results in in an urban environment. Table I is consistent with several other studies of urban centers across North America and Europe. All studies indicate an exponential decline in utilization directly proportional to frequency, f. We refer to frequency ranges with known Heavy Utilization as $\mathcal{B}_{HU}$.

TABLE I

Average utilization duty cycle across a frequency range.

| Frequency range | Average utilization duty cycle |
|---|---|
| 75-1000 | 42.00% |
| 1000-2000 | 13.30% |
| 2000-3000 | 3.73% |
| 3000-4000 | 4.01% |
| 4000-5000 | 1.63% |
| 5000-6000 | 1.98% |
| 6000-7075 | 1.78% |

Restricted Bands, $\mathcal{B}_{RB}$: Further to having to contend with both NBI and WBI, some bands, referred to as $\mathcal{B}_{RB}$, have been deemed restricted by the regulatory bodies (47 CFR 15.205).

5.3.2 Pulse and Filter Design

Based on the knowledge of the statistics of the communication channel 106, 306, 406 including its model, the types of interference across it and the existence of $\mathcal{B}_{RB}$, the disclosure designs pulses such as $\vec{h}_{l,k}$ 1201, 1204, $\vec{\wp}_{k,0}$ 1209, $\vec{g}_{l,k}$ 1203, 1206 as well as filters such as a Pre-channel filter 500 at Tx 104, 204, 304, and a Post-channel filter 615 at Rx 108, 208, 308 with the goal of optimizing $\mathcal{C}_{MTF}$ subject to Constraints 1-3.

Design of $\vec{h}_{l,k} \in \mathbb{C}^{N_l \times 1}$ 1201, 1204: A fundamental design for $\vec{h}_{l,k}$ 1201, 1204 in (9) is a rectangular pulse. Even though it has all its zeros on the unit circle, it is possible to move its zeros away from the unit circle by shifting it in frequency by $1/(2N_lT_s)$. This shift forms a complex pulse, $\vec{h}_{REC,l,k}$ 1212, 1213, with a real part in the shape of one lobe of a cosine wave and an imaginary part in the shape of a negative lobe of a sine wave. When all $\vec{h}_{l,k} \forall l$ 1201, 1204 are selected as $\vec{h}_{REC,l,k}$ 1212, 1213, $\vec{\wp}_{k,\aleph_k}$ 1208 in (9) is denoted as $\vec{\wp}_{REC,\aleph_k}$ 1214. When $\vec{\wp}_{k,\aleph_k}$ 1208 in (9) is selected as $$\vec{\wp}_{REC,1}, \lambda \triangleq \rho/\daleth$$

in Theorem III is asymptotically equal to π. In this case, the amplitude of $\vec{\wp}_{REC,1}$ is selected to comply with Constraint 1.

Design of $\vec{\wp}_{k,0} \in \mathbb{C}^{N_0 \times 1}$ 1209: A possible design of $\vec{\wp}_{k,0}$ 1209 in (8) is:

$$\vec{\wp}_{k,0} = \sqrt{\daleth/\mathcal{R}} \, \mathcal{DFT}^{-1}\left\{\left[e^{j\vartheta_{k,1}} \; \cdots \; e^{j\vartheta_{k,N_0}}\right]^T\right\} \qquad (16)$$

where $\mathcal{DFT}^{-1}$ denotes an inverse Discrete Fourier Transform (DFT) operation; and the phase, $\vartheta_{k,i} \in \{0,2\pi\}$, is chosen as PR with a uniform distribution across $\{0,2\pi\}$ for $1 \leq i \leq N_0$. $\vec{\wp}_{k,0}$ 1209 is also known as a frequency-based PR polyphase signature.

Design of $\vec{g}_{l,k} \in \mathbb{C}^{N_l \times 1}$ 1203, 1206: A possible design of $\vec{g}_{l,k}$ 1203, 1206 in (9) is $$\vec{g}_{l,k} = \mathcal{DFT}^{-1}\left\{\left[e^{j\vartheta_{l,k,1}} \; \cdots \; e^{j\vartheta_{l,k,N_l}}\right]^T\right\} \qquad (17)$$

with the phase, $\vartheta_{l,k,i} \in \{0,2\pi\}$, chosen as PR with a uniform distribution across $\{0,2\pi\}$ for $1 \leq i \leq N_l$, similar to $\vec{\wp}_{k,0}$ 1209 in (16), except that $\vartheta_{l,k,1}$ must equal $\vartheta_{l,k,N_l}$ in order to minimize the overhead factor, $r$. Since the communication channel forces $H_{MTF_k}(\Omega)$ in (14) to be multiplied by $H_{Ch}(\Omega)$, the resulting product, $H_{MTF_k,Ch}(\Omega)$, forces $\vec{g}_{l,k}$ 1203, 1206 in (17) to be replaced by $$\vec{g}_{l,k,Ch} = \mathcal{DFT}^{-1}\left\{\left[|a_{l,k,1}|e^{j\vartheta_{l,k,1}} \; \cdots \; |a_{l,k,N_l}|e^{j\vartheta_{l,k,N_l}}\right]^T\right\} \qquad (18)$$

when $\mathcal{D}=1$ and $\aleph_k=1$ where $|a_{l,k,1}|, \ldots, |a_{l,k,N_l}|$ are random amplitudes, which have either a Rician distribution with a strong LOS component across a LOS channel, or a Rayleigh distribution across a NLOS channel, and $$\mathcal{N}_l \triangleq N_l + \delta N - 1.$$

Selection of $q$ when $\mathbb{P}_{Mask}(f) \equiv \mathbb{P}_{LTE}(f)$: The disclosure selects $q$ in (12) as 0.5% and allocates the remaining 0.5% to the DOBE 706 BW in $\vec{\wp}_{k,\aleph_k}$ 1208. Under Constraint 2, (12) can be re-written as $$\lim_{N_0 \to \infty} p_k = (N/r)_{dB} + 23 \text{ dB}.$$

Design of Pre-channel filtering 500 at Tx 104, 204, 304: In order to comply with $\mathcal{B}_{RB}$ (47 CFR 15.205), and to prevent transmitting across $\mathcal{B}_{HU}$, a pre-channel filter 500 is recommended at Tx 104, 204, 304. Furthermore, according to (15), the effect of the FSPL is to increase the DOD, $\aleph_k$, of $h_{MTF}$ 1104 by 1 despite the fact that $\vec{\wp}_{k,0}$ 1209 has been added in (8) to force the resulting DOD asymptotically take the value 0. In order to address all 3 concerns, $h_{MTF}$ 1104 is replaced by a pre-channel MTF matrix, $h_{MTF}^\mathcal{P}$, based on replacing in (8) $\vec{\wp}_{k,\aleph_k}$ 1208 by $\vec{\wp}_{k,\aleph_k}^\mathcal{P}$, $\vec{\wp}_{k,0}$ 1209 by $\vec{\wp}_{k,0}^\mathcal{P}$ and $\{h_{MTF}\}_k$ by $$\{h_{MTF}^\mathcal{P}\}_k \triangleq \vec{p}_{k,N}^\mathcal{P} + \vec{p}_{k,0}^\mathcal{P}$$

with a DTFT $H^{\mathcal{P}}_{MTF_k}(\Omega)$ pre-processed by the following 2 actions:

1. Pre-distort $H^{\mathcal{P}}_{MTF_k}(\Omega)$ by $|\Omega|$ by $\forall \Omega \in [-\pi, 0) \cup (0, \pi]$ as $$H^{\mathcal{P}}_{MTF_k}(\Omega) = \frac{|\Omega|}{\sqrt{v}} H_{MTF_k}(\Omega) \; \forall \; \Omega \in [-\pi, 0) \cup (0, \pi] \quad (19)$$

where v is selected to keep $$E\{|H^{\mathcal{P}}_{MTF_k}(\Omega)|^2\} \leq \frac{1}{\mathcal{R}} \forall \; \Omega \in [-\pi, 0) \cup (0, \pi].$$

2. Force $H^{\mathcal{P}}_{MTF_k}(\Omega)$ to contain a null at the excluded band:

$$\mathcal{B}_{ex} \triangleq \{\{\mathcal{B}_{RB} \cup \mathcal{B}_{HU}\} \cap \mathcal{B}_{TL}\} \cup \bar{\mathcal{B}}_{TL}$$

with $$\mathcal{B}_{HU} \triangleq [0,2 \text{ GHz}]$$

and $\bar{\mathcal{B}}_{TL}$ the complement of $$\mathcal{B}_{TL} \triangleq [f_c - f_s/4, f_c + f_s/4] \text{ and } f_c \geq f_s/4.$$

As a result of both actions, $p_k$ in (10) is replaced by $$p_k \propto \left( \frac{1 + \frac{N_0}{\lambda v \mathcal{R}}}{c_{K,N,d,\aleph} \frac{1}{r} K^{2\aleph-1} N_d^{2\aleph} + c_{N_0,0} \frac{rN_0}{\lambda v \mathcal{R} N}} \right) \text{ as } N \gg 1 \quad (20)$$

and (11) is replaced by $$\lim_{N_0 \to \infty} p_k \to \left(\frac{N}{r}\right)_{dB} - 5.16 \text{ dB}$$

since $v=2(\pi^2/6)$ according to Basel problem where $$2\left( \lim_{N_0 \to \infty} \sum_{n=1}^{N_0} \frac{1}{n^2} \right) = 2(\pi^2/6) = 5.16 \text{ dB}$$

when the samples are real. On the other hand, (12) is replaced by $$\lim_{N_0 \to \infty} p_k = \left(\frac{N}{r}\right)_{dB} - (q)_{dB} - 5.16 \text{ dB}.$$

For example, when $$q = 0.5\%, \lim_{N_0 \to \infty} p_k = \left(\frac{N}{r}\right)_{dB} + 17.9 \text{ dB}.$$

Design of Post-channel filtering 615 at Rx 108, 208, 308: Post-channel filtering 615 can be used at Rx 108, 208, 308 to reduce the effects of NBI across the communication channel. In this case, it must include an MTF excision filter, which consists of the following two steps:

(a) Estimate the frequency range, $\mathcal{B}_{NBI}$, corresponding to NBI. A frequency, f, belongs to $\mathcal{B}_{NBI}$ when $\mathcal{S}_{y(t)}(f) \geq \mathcal{S}_{x_k(t)}(f) + \mathcal{S}_{Th}$ where $\mathcal{S}_{Th}$ is a threshold selected to meet a certain optimization criterion for reducing NBI.

(b) Excise the estimated NBI by forcing a null in the PSD, $\mathcal{S}_{y(t)}(f)$, of the continuous-time version, y(t), of $\vec{r}$, at f∈ $\mathcal{B}_{NBI}$.

Post-channel filtering should also include a null at $$\mathcal{B}_{NBI} \cup \mathcal{B}_{ex} \triangleq \{\{\mathcal{B}_{NBI} \cup \mathcal{B}_{RB} \cup \mathcal{B}_{HU}\} \cap \mathcal{B}_{TL}\} \cup \bar{\mathcal{B}}_{TL}$$

in order to reduce the effect of noise and interference at Rx 108, 208, 308.

Selection of Sampling Type and frequency, $f_s$: There are 3 types of sampling available in communication systems: baseband sampling, IF sampling and RF sampling. RF sampling is recommended when $f_s \geq 4f_c$, since it does not require any up-conversion/down-conversion stages as shown in FIGS. 6a and 6b. In this case, the Carrier Frequency, $f_c$, is selected $\leq f_s/4$. On the other hand, IF sampling is recommended over baseband sampling when $f_s < 4f$, since it requires a smaller number of conversion stages as shown in FIGS. 5a and 5b. In this case, the Intermediate Frequency, $f_{IF}$, is selected equal to $f_s/4$.

Selection of Carrier Frequency $f_c$: In order to select a frequency range s.t. $f_c \leq f_s/4$ with relatively low interference and low path loss, while allowing for a multipath-rich environment that is suitable for MIMO communications and while avoiding $\mathcal{B}_{HU}$, the disclosure proposes to select $f_c \in [2 \text{ GHz}, 6 \text{ GHz}]$. It is possible to reduce $p_k \; \forall k$ by selecting $f_c$ for the $k^{th}$ Tx to be distinct from all the other K−1 carrier frequencies $\forall k$. An optimal selection of the K carrier frequencies is for each frequency to select one unique frequency either from the optimal set $$S_{f_c} \triangleq \left\{ \frac{f_s}{4K}, \frac{3f_s}{4K}, \ldots, \frac{(2K-1)f_s}{4K} \right\}$$

or from any other set such as $$S'_{f_c} \triangleq \left\{ \frac{(K+1)f_s}{8K}, \frac{(K+3)f_s}{8K}, \ldots, \frac{(3K-1)f_s}{8K} \right\}.$$

When K>1 and the K carrier frequencies are selected uniquely from $S_{f_c}$ or from $S_{f_c}'$, Post-channel filtering 615 containing an MTF excision filter is recommended at Rx 108, 208, 308 in order to reduce NBI, which originates from the other K−1 interfering carrier frequencies.

5.3.3 MTF System Architecture

The architecture shown in FIGS. 1-4 together with Tx 104, 204, 304 and Rx 108, 208, 308 as described in FIGS.

5a, 5b, 6a, 6b enable an MTF system to communicate with other co-located MTF systems, when using overlapping licensed or unlicensed bands. Such MTF systems include cellular-type, Wi-Fi-type and wireless sensor/Internet-of-Things-type systems, all capable of communicating with one another. FIGS. 1-4 together with FIGS. 5a, 5b, 6a, 6b, have a digital component 510, which includes MTF Modulator 102, 202, 302, a portion of Tx 104, 204, 304, a portion of Rx 108, 208, 308 and MTF detector 110, 210, 310. The digital portion of Tx 104, 204, 304 includes the Pre-Channel filter 500 and the digital portion of Digital-to-Analog (D/A) converter 503. The digital portion of Rx 108, 208, 308 includes the Post-Channel filter 615 and the digital portion of Analog-to-Digital (A/D) converter 613. The digital component is mostly software-defined (S/W) and is allowed to change personality according to the MTF system it is communicating with, by adjusting $\{h_{MTF}\}_k$, Pre-channel filter 500, Post-channel filter 615 and MMSE-SIC detector 110, 210, 310. Also, the architecture shown in FIGS. 1-4 together with a portion of Tx 104, 204, 304 and a portion of Rx 108, 208, 308 have analog components 511, 513, 616, 618, which are hardware-defined (H/W). As described in FIGS. 5a, 5b, 6a, 6b, the analog portions of Tx 104, 204, 304 and Rx 108, 208, 308 include converters (e.g. D/A 502, Up/Down 504, 611 and A/D 613), analog filters 607 (e.g. Band-Pass Filter (BPF) and Low-Pass Filter (LPF)) and amplifiers (e.g. Power Amplifier (PA) 506 and Low Noise Amplifier (LNA) 609).

Given that most existing systems contain a S/W component and a H/W component, it is possible to upgrade such systems to an MTF system through a S/W download, without requiring a H/W modification as long as it is possible to overcome its limitation. For example, when the sampling frequency, $f_{A/D}$, of the available A/D converter is smaller than the required $f_s$ by a multiple $\mathcal{D}>1$ s.t. $f_{A/D}=f_s/\mathcal{D}$, it is possible to reduce $f_s$ by $\mathcal{D}$ to accommodate $f_{A/D}$ while maintaining the same desired channel capacity, $\mathcal{C}_b$, using several non mutually exclusive techniques:

MTF Technique 1: Decimate $h_{MTF}$ by $\mathcal{D}$, while increasing $T_s$ by $\mathcal{D}$.

MTF Technique 2: Relax Constraint 3 by loading $\mathcal{D}>1$ bits of information/DOF.

MTF Technique 3: Select $K_b=\mathcal{D}$ while forcing each column of $K_b$ to have a distinct $f_c$.

It is possible to combine several of the MTF techniques shown above in order to overcome the limitation of having $f_{A/D}=f_s/\mathcal{D}$. For example, by increasing the number of information bits/DOF from 1 bit to 2 bits, while increasing $K_b$ from 1 to 4, we have $\mathcal{D}=8$.

5.4 MTF MA Networks

This section designs MTF MA networks across a centralized topology similar to existing MA networks, such as LTE and Wi-Fi networks. As typical of any centralized topology, the MTF MA network consists of two types of transmissions: (a) downlink (DL) transmissions, from Base Station (BS) or Access Point (AP) to device; and (b) uplink (UL) transmissions, from device to BS/AP. The designs of the MTF MA networks are based on the following assumptions:

5.4.1 Assumptions a) Several co-located centralized MTF MA networks use overlapping licensed or unlicensed bands. Based on the system architecture in Section 5.3.3, such networks are capable to collaborate, which offers many benefits. For example Time Division Duplex (TDD) can be implemented, which forces temporal separation between DL and UL transmissions.

b) The MTF BS/AP contains an antenna array to be used in beamforming in the DL portion of most of the MTF MA networks in order to reduce WBI from interfering BSs/APs at devices.

c) The range, $\mathfrak{R}_k$, between the $k^{th}$ MTF Tx 104, 304 and an MTF Rx 108, 308 is a function of the link budget, $\mathfrak{L}_k$, between them, where $$\mathfrak{L}_{k,dB} \triangleq p_{dBm} - NF_{dB} - (\mathbb{N}_o \mathcal{W}_m)_{dB} - \max_k\{p_k^{\mathcal{P}}\}_{dB} + G_{dB} \quad (21)$$

$p_{dBm}$ is the average transmitted power; $NF_{dB}$ is the Noise Figure of Rx; $p_k^{\mathcal{P}}$ corresponds to $$f_s^{\mathcal{P}} \triangleq f_s(1-\zeta_{ex}),$$

which is the Noise-equivalent BW in Hz at the output of the post-channel filter; $\zeta_{ex}$ is the excision factor, defined as $$\zeta_{ex} \triangleq \frac{1}{f_s}\int_{f\in\mathcal{B}_{ex}} fdf;$$

$G_{dB}$ is the antenna gain between Tx and Rx.

d) A unique $\vec{g}_{l,k}$ 1203, 1206 as defined in (17) and a unique $\vec{\wp}_{k,0}$ 1209 as defined in (16) are selected for the $k^{th}$ MTF device $\forall k$.

e) $\vec{\wp}_{k,\aleph_k}^{\mathcal{P}}$ 1208, is designed s.t. its PSD, $S_{\wp_{k,\aleph_k}^{\mathcal{P}}(t)}(f)$ 808, has nulls at $\mathcal{B}_{NBI} \cup \mathcal{B}_{ex}$ where $\wp_{k,\aleph_k}^{\mathcal{P}}(t)$ is the continuous-time version of $\vec{\wp}_{k,\aleph_k}^{\mathcal{P}}$ 1208.

f) $\vec{\wp}_{k,0}^{\mathcal{P}}$ 1209 is designed s.t. its PSD, $S_{\wp_{k,0}^{\mathcal{P}}(t)}(f)$ 809, is pre-distorted according to (19), where $\wp_{k,0}^{\mathcal{P}}(t)$ is the continuous-time version of $\vec{\wp}_{k,0}^{\mathcal{P}}$ 1209.

g) $d\mid_{UL}=N$ in the UL portion of an MTF MA network in order to decrease $$\max_k\{\mathcal{P}_k\}$$

in (21), while $d\mid_{DL}=1$ in the DL portion in order to maintain a high DL capacity, $\mathcal{C}_{MTF}$, where $p_k^{\mathcal{P}}\mid_{UL}$ and $d\mid_{DL}$ are the delays in (2) corresponding to UL and DL respectively. An additional reason for selecting $d\mid_{UL}=N$ is to reduce the Peak-to-Average Power Ratio (PAPR) corresponding to transmissions from an MTF device, which can be reduced even further by selecting $\vec{\wp}_{k,\aleph_k}$ 1208 in (9) as $\vec{\wp}_{REC,1}$ 1214. A further reason for selecting $d\mid_{UL}=N$ is to have a memoryless MTF MA network with $\mathcal{C}_{MTF}\mid_{L<\infty}=$ $\mathcal{C}_{MTF}|_{L\to\infty}$. On the other hand, selecting $d|_{DL}=1$ in the DL portion implies that the MTF MA network has memory and $$\mathcal{C}_{MTF}|_{L<\infty} = L\bigg/\left(L+\frac{N}{d}-1\right)\mathcal{C}_{MTF}.$$

For example, when $10N<L<\infty$, $\mathcal{C}_{MTF}|_{L<\infty} > 0.9\,\mathcal{C}_{MTF}|_{L\to\infty}$.

In the UL portion, all Q symbols in $\vec{\alpha}$ 101, 201, 301, corresponding to all the K active Txs 104, 204, 304, are required to be detected, while in the DL portion, only the desired symbols in a $\vec{\alpha}$ 101, 201, 301, corresponding to the desired Tx 104, 204, 304, are required to be detected, with the remaining symbols, corresponding to the $K_i = K-1$ interfering columns in $h_{MTF}$ 1104, ignored. For this reason, a preferred embodiment is to constrain $$\max_k \{\mathcal{P}_k\}$$

in (21) to correspond to full implementation of Constraint 3 $\forall k$ for the UL portion, while in the DL portion, a preferred embodiment is to constrain $$\max_k \{\mathcal{P}_k\}$$

in (21) to correspond to a partial implementation of Constraint 3 corresponding only to the desired received symbols in $\vec{\alpha}$ 101, 201, 301.

5.4.2 Designs of MTF MA Networks

Based on the above assumptions, we design 3 MTF MA networks, namely $MTF_1$, $MTF_2$ and $MTF_3$, all constrained by a mask with a BW, $\mathcal{W}_m = 20$ MHz. This implies that $$(NT_s)_{min} \triangleq r/20\text{ MHz}$$

1301. For example, when $\mathbb{P}_{Mask}(f)$ 701 is selected as $\mathbb{P}_{WiFi}(f)$ and $\vec{\mathcal{P}}^p_{k,\aleph_k}$ 1208 as $\vec{\mathcal{P}}^p_{REC,1}$ 1214 with a PSD $\mathcal{S}_{\mathcal{P}^p_{REC,1}(t)}(f)$ 908, $r = 64/3 = 21.3$ and $$(NT_s)_{min} \triangleq r/20\text{ MHz} = 1.066\,\mu s$$

1301. On the other hand, when $\mathbb{P}_{Mask}(f)$ 107 is selected as $\mathbb{P}_{LTE}(f)$ and $\vec{\mathcal{P}}^p_{k,\aleph_k}$ 1208 as $\vec{\mathcal{P}}^p_{REC,1}$ 1214 with a PSD $\mathcal{S}_{\mathcal{P}^p_{REC,1}(t)}(f)$ 908, $r = 40.8$ and $$(NT_s)_{min} \triangleq \frac{r}{20\text{ MHz}} = 2.04\,\mu s$$

1301.

Moreover, since the DL portion of each network is assumed to have relatively low interference, it is characterized to be with memory, with $d = K = 1$, and $$T_{s,max}|_{DL} \triangleq 1/\mathcal{C}_b|_{DL} \geq 1/f_s|_{DL}$$

1301. On the other hand, since the UL portion of each network is assumed to have relatively high interference, it is characterized as memoryless, with $d = N$, $K \gg 1$, and $$T_{s,max}|_{UL} \triangleq \frac{K}{N\mathcal{C}_b|_{UL}} \geq 1/f_s\big|_{UL}$$

1301. Therefore, $$N_{min}|_{DL} \triangleq \frac{(NT_s)_{min}}{T_{s,max}|_{DL}} = \frac{r\,\mathcal{C}_b|_{DL}}{20\text{ MHz}}\text{ and}$$

$$N_{min}|_{UL} = \Delta\frac{(NT_s)_{min}}{T_{s,max}|_{UL}} = \frac{r\,\mathcal{C}_b|_{UL}\,N}{20\text{ MHz}\,K}$$

1301.

Design Parameters for $MTF_1$, $MTF_2$ and $MTF_3$:
1. $MTF_1$ is selected to have a desired DL channel capacity of $$\mathcal{C}_{b_1}|_{DL} = 0.2 Gbps$$

1301, and a desired UL channel capacity of $$\mathcal{C}_{b_1}|_{UL} = 0.2 Gbps$$

1301, both across the unlicensed (Title 47 CFR 15.247) mid-band frequency of $f_{c_1} = 2.45$ GHz. We also select for both DL and UL, $$f_{s_1}|_{DL} = f_{s_1}|_{UL} = 0.2\text{ GHz}$$

and IF sampling with $$\mathcal{B}_{TL_1} = \Delta\left[f_{c_1} - f_{s_1}/4,\ f_{c_1} + \frac{f_{s_1}}{4}\right]\text{ and}$$

$$\mathcal{B}_{ex_1} \triangleq \{\{\mathcal{B}_{NBI_1} \cup \mathcal{B}_{RB} \cup \mathcal{B}_{HU}\} \cap \mathcal{B}_{TL_1}\} \cup \mathcal{B}_{TL_1}.$$

2. $MTF_2$ is selected to have $$\mathcal{C}_{b_2}|_{DL} = 2 Gbps$$

1301 and $$\mathcal{C}_{b_2}|_{UL} = 2 Gbps$$

1301, both across the unlicensed mid-band frequency of $f_{c_2}$=5.8 GHz. We also select $$f_{s_2} |_{DL} = f_{s_2} |_{UL} = 2 \text{ GHz}$$

and IF sampling with $$\mathcal{B}_{TL_2} \triangleq [f_{c_2} - f_{s_2}/4, f_{c_2} + f_{s_2}/4] \text{ and}$$
$$\mathcal{B}_{ex_2} \triangleq \{\{\mathcal{B}_{NBI_2} \cup \mathcal{B}_{RB} \cup \mathcal{B}_{HU}\} \cap \mathcal{B}_{TL_2}\} \cup \overline{\mathcal{B}}_{TL_2}.$$

3. MTF$_3$ uses a licensed band at $f_{c_3}$=3.5 GHz with $$\mathcal{C}_{b_3} |_{DL} = 14 Gbps$$

1301 and $$\mathcal{C}_{b_1} |_{UL} = 6 Gbps$$

1301. We also select $$f_{s_3} |_{DL} = f_{s_3} |_{UL} = 14 \text{ GHz}$$

and RF sampling with $$\mathcal{B}_{TL_3} \triangleq [f_{c_3} - f_{s_3}/4, f_{c_3} + f_{s_3}/4] \text{ and}$$
$$\mathcal{B}_{ex_3} \triangleq \{\{\mathcal{B}_{NBI_3} \cup \mathcal{B}_{RB} \cup \mathcal{B}_{HU}\} \cap \mathcal{B}_{TL_3}\} \cup \overline{\mathcal{B}}_{TL_3}.$$

FIG. 9 displays the PSD, $S_{\wp^p_{REC,1}(t)}$ (f) 908, of $\vec{\wp}^p_{REC,1}$ and the PSD, $S_{\wp^p_{k,0}(t)}$ (f) 809, of $\vec{\wp}^p_{k,0}$ 1209 for MTF$_3$, with nulls at $\mathcal{B}_{ex_3}$, when $\vec{\wp}^p_{k,x_k}$ 1208 is selected as $\vec{\wp}^p_{REC,1}$ 1214 while $\vec{\wp}^p_{k,0}$ 1209 is selected as defined in (16) pre-distorted according to (19). One advantage of MTF$_3$ over MTF$_1$ and over MTF$_2$ is that it is possible to increase $$\mathcal{C}_{b_3} |_{DL} \text{ and } \mathcal{C}_{b_3} |_{UL}$$

by a multiple $\mathcal{D}$ by decreasing $$T_s \triangleq 1/f_{s_3}$$

by $\mathcal{D}$ regardless of the value of $\mathcal{W}_m$ at the cost of an increase in $\wp_k$.

Practical Consideration I: In general, it is possible to increase $\mathcal{C}_b |_{UL}$ and $\mathcal{C}_b |_{DL}$ by a multiple $\mathcal{D}$ while maintaining the same f$_s$ by selecting any combination of the 3 MTF Techniques 1-3 described in Section 5.3.3. For example, by increasing the number of information bits/DOF from 1 bit to 2 bits/DOF, while increasing $K_b$ from 1 to 4, we can have $\mathcal{D}$=8, and consequently, $$\mathcal{C}_{b_1} |_{DL} = \mathcal{C}_{b_1} |_{DL} = 1.6 Gbps,$$
$$\mathcal{C}_{b_2} |_{DL} = \mathcal{C}_{b_2} |_{DL} = 16 Gbps \text{ and } \mathcal{C}_{b_3} |_{DL} = \mathcal{C}_{b_3} |_{DL} = 112 Gbps.$$

Practical Consideration II: It is possible to increase K by a multiple $\mathcal{D}$ while keeping $\mathcal{C}_b |_{UL}$ and $\mathcal{C}_b |_{DL}$ fixed and while maintaining the same f$_s$, by selecting MTF Technique 3 in Section 5.3.3. In this case, the increase in $\wp_k$ is reasonable as long as $\mathcal{D} \leq 8$. If $\mathcal{D} > 8$, the increase in $\wp_k$ can remain reasonable by increasing the delay, $d$. For example, it is possible to double $\mathcal{D}$ from 8 to 16, by doubling $d$ from 1 to 2 samples, which halves $\mathcal{C}_b |_{UL}$ and $\mathcal{C}_b |_{DL}$. The implication of having K increase from 1 to 16 implies that 16 co-located MTF networks can co-exist across the same overlapping licensed and unlicensed bands, after forcing $\mathcal{C}_b |_{UL}$ and $\mathcal{C}_b |_{DL}$ in to be halved.

Practical Consideration III: It is possible to increase K by $\mathcal{D} > 8$ without forcing $\mathcal{C}_b |_{UL}$ and $\mathcal{C}_b |_{DL}$ to be halved by decreasing the ratio, K/N$_{\overline{ex}}$, where $$N_{\overline{ex}} \triangleq N(1 - \zeta_{ex}),$$

as shown below:

Increasing N$_{\overline{ex}}$ when K is fixed:
a) One way to increase N$_{\overline{ex}}$ is by increasing $N_J$ at Tx 104, 204, 304, which does not affect the desired DL capacity per MTF device, $\mathcal{C}_b |_{DL}$ 1301. It reduces the capacity per MTF device for the UL portion, without affecting the overall desired network capacity, $\mathcal{C}_b |_{UL}$ 1301.
b) Another way to increase N$_{\overline{ex}}$ is by increasing $N_J$ indirectly at Rx 108, 208, 308 by taking advantage of the frequency-selective nature of a multipath-rich communication channel 106, 306, 406, which forces N to be replaced by $\mathcal{N} \geq N$, or equivalently, forces N$_{\overline{ex}}$ to be replaced by $$\mathcal{N}_{\overline{ex}} \triangleq \mathcal{N}(1 - \zeta_{ex}).$$

This is often referred to as multipath diversity. In this case, $\vec{g}_{l,k}$ 1203, 1206 in (17) is replaced by $\vec{g}_{l,k,Ch}$ in (18) at Rx 108, 308.
c) Another way to increase N$_{\overline{ex}}$ indirectly at Rx 108, 208, 308 is by increasing the number, N$_r$, of receive antennas, which does not affect the channel capacity per MTF device, while it increases the overall network capacity accordingly. This is often referred to as spatial diversity or MU-MIMO as shown in FIG. 4. Assuming that each MTF BS/AP contains an array of N$_r$ receiving antennas and that K is the number of simultaneously active MTF devices, therefore, the i$^{th}$ receiving antenna produces the received signal, $$\vec{r}_i \triangleq \vec{y}_i + \vec{w}_i \ \forall \ i \in \{1, \cdots, N_r\}$$

where $$\vec{y}_i \triangleq \vec{h}_{i,1,Ch} * \vec{\beta}_1 + \cdots \vec{h}_{i,K,Ch} * \vec{\beta}_K; \vec{h}_{i,j,Ch}$$

is the communications channel 106, 306, 406 between the $j^{th}$ transmitting antenna and the $i^{th}$ receiving antenna and $\vec{w}_i$ is the noise at the $i^{th}$ receiving antenna.

The invention claimed is:

1. A method for transmitting frames of information across a communications channel, the method comprising;
   a first conversion operation for converting the frames of information into a discrete-time Time-Limited signal where the frames of information are contained in a plurality of Finite Access Time (FAT) Degrees Of Freedom (DOF);
   a second conversion operation for converting the discrete-time Time-Limited signal into a continuous-time signal; and
   a transmission operation for transmitting the continuous-time signal across the communications channel.

2. The method in claim 1, in which the first conversion operation uses a matrix that is designed such that the plurality of FAT DOF is selected as per Design Step I of a Mask-Matched Time-Limited method with FAT DOF (MTF).

3. The method in claim 2, in which the matrix is Block Toeplitz.

4. The method in claim 2, in which the matrix is further designed such that the selected plurality of FAT DOF is enhanced as per Design Step II of the MTF.

5. The method in claim 4, in which the matrix is further designed such that the selected and enhanced plurality of FAT DOF is randomized as per Design Step III of the MTF.

6. The method in claim 5, in which each column of the matrix is the result of adding a plurality of sub-columns; with the first sub-column corresponding to a function with a Degree of Differenciability (DOD) larger than zero.

7. The method in claim 6, in which the second sub-column corresponds to a function with a DOD equal to zero.

8. The method in claim 7, in which the elements of the second sub-column are independent pseudo-random variables.

9. The method in claim 8, in which the first sub-column is the result of performing a linear convolution operation between a plurality of pulses, each pulse with a DOD larger than zero.

10. The method in claim 9, in which the first pulse is the result of performing a circular convolution operation between
    a first sub-pulse with a DOD larger than zero; and
    a second sub-pulse with a DOD equal to zero.

11. A An apparatus for transmitting frames of information across a communications channel, the apparatus comprising
    a first converter for converting the frames of information into a discrete-time Time-Limited signal where the frames of information are contained in a plurality of Finite Access Time (FAT) Degrees Of Freedom (DOF);
    a second converter for converting the discrete-time Time-Limited signal into a continuous-time signal; and
    a transmitter for transmitting the continuous-time signal across the communications channel.

12. The apparatus in claim 11, in which the first converter uses a matrix that is designed such that the plurality of FAT DOF is selected as per Design Step I of a Mask-Matched Time-Limited method with FAT DOF (MTF).

13. The apparatus in claim 12, in which the matrix is Block Toeplitz.

14. The apparatus in claim 12, in which the matrix is further designed such that the selected plurality of FAT DOF is enhanced as per Design Step II of the MTF.

15. The apparatus in claim 14, in which the matrix is further designed the selected and enhanced plurality of FAT DOF is randomized as per Design Step III of the MTF.

16. The apparatus in claim 15, in which each column of the Matrix is the result of adding a plurality of sub-columns; with the first sub-column corresponding to a function with a Degree of Differenciability (DOD) larger than zero.

17. The apparatus in claim 16, in which the second sub-column corresponds to a function with a DOD equal to zero.

18. The apparatus in claim 17, in which the elements of the second sub-column are independent pseudo-random variables.

19. The apparatus in claim 18, in which the first sub-column is the result of performing a linear convolution operation between a plurality of pulses, each pulse with a DOD larger than zero.

20. The apparatus in claim 19, in which the first pulse is the result of performing a circular convolution operation between
    a first sub-pulse with a DOD larger than zero; and
    a second sub-pulse with a DOD equal to zero.

* * * * *